US008484058B2

(12) United States Patent
Benson et al.

(10) Patent No.: US 8,484,058 B2
(45) Date of Patent: Jul. 9, 2013

(54) COMPUTER IMPLEMENTED METHOD FOR MANAGING ELECTRONIC TICKET REQUESTS

(75) Inventors: Thomas Harward Benson, Costa Mesa, CA (US); Brett Eric Michalak, Costa Mesa, CA (US)

(73) Assignee: Tickets.com, Inc., Costa Mesa, CA (US)

( * ) Notice: Subject to any disclaimer, the term of this patent is extended or adjusted under 35 U.S.C. 154(b) by 241 days.

(21) Appl. No.: 11/806,603

(22) Filed: Jun. 1, 2007

(65) Prior Publication Data
US 2008/0300925 A1 Dec. 4, 2008

(51) Int. Cl.
G06Q 10/00 (2006.01)
G06Q 50/00 (2006.01)

(52) U.S. Cl.
USPC .................................. 705/5; 705/6; 705/26.1

(58) Field of Classification Search
USPC .............. 705/1, 5, 6, 26, 1.1, 14.1, 26.1, 27.1
See application file for complete search history.

(56) References Cited

U.S. PATENT DOCUMENTS

| 7,024,381 | B1 * | 4/2006 | Hastings et al. ................ 705/26 |
| 7,346,520 | B2 * | 3/2008 | Etzioni et al. .................. 705/1.1 |
| 7,899,717 | B2 | 3/2011 | Joao |
| 2002/0082969 | A1 * | 6/2002 | O'Keeffe et al. ............... 705/37 |
| 2004/0225551 | A1 | 11/2004 | Hole |
| 2006/0069926 | A1 | 3/2006 | Ginter et al. |
| 2006/0085259 | A1 * | 4/2006 | Nicholas et al. ................ 705/14 |
| 2007/0055554 | A1 * | 3/2007 | Sussman et al. .................. 705/5 |
| 2007/0271123 | A1 * | 11/2007 | Miyashita ....................... 705/5 |
| 2008/0189147 | A1 | 8/2008 | Bartlett |
| 2008/0255889 | A1 | 10/2008 | Geisler et al. |
| 2008/0300925 | A1 | 12/2008 | Benson et al. |
| 2008/0312938 | A1 | 12/2008 | Toole et al. |
| 2009/0063207 | A1 | 3/2009 | Brodzeller |
| 2009/0063667 | A1 | 3/2009 | Smith et al. |
| 2009/0210314 | A1 | 8/2009 | Chau |

OTHER PUBLICATIONS http://www.thefreedictionary.com/database.*
Thannopoulos, Yamni; Gargalianos, Dimitri "Ticketing of Large Scale Events: The Case of Sydney 2000 Olympic Games." 2002, Facilities, vol. 20, No. 1/2, pp. 22-33.*
PCT International Search Report and Written Opinion on application No. PCT/US10/58914 dated Feb. 8, 2011; 9 pages.
US Office Action for U.S. Appl. No. 12/631,234, issued Jun. 27, 2012, 10 pages.
US Office Action for U.S. Appl. No. 12/631,234, dated Feb. 1, 2012; 25 pages.

* cited by examiner

*Primary Examiner* — John Hayes
*Assistant Examiner* — Michael Harrington
(74) *Attorney, Agent, or Firm* — Foley & Lardner LLP

(57) ABSTRACT

A ticketing management system and computer implemented method for managing ticket requests is provided including a request management system, configured to receive ticket requests and allocate tickets to purchasers, a back-end office ticketing system, configured to record ticket requests and a fulfillment center configured to receive the ticket requests from the back-end office ticketing system and deliver the tickets to the purchasers. The request management system includes a shopping module. The shopping module is configured to receive at least one primary request for an event and storing the primary request, receive at least one alternate request for an event and storing the alternative request and allocate events to a user based on the primary request and alternative request selections.

16 Claims, 33 Drawing Sheets

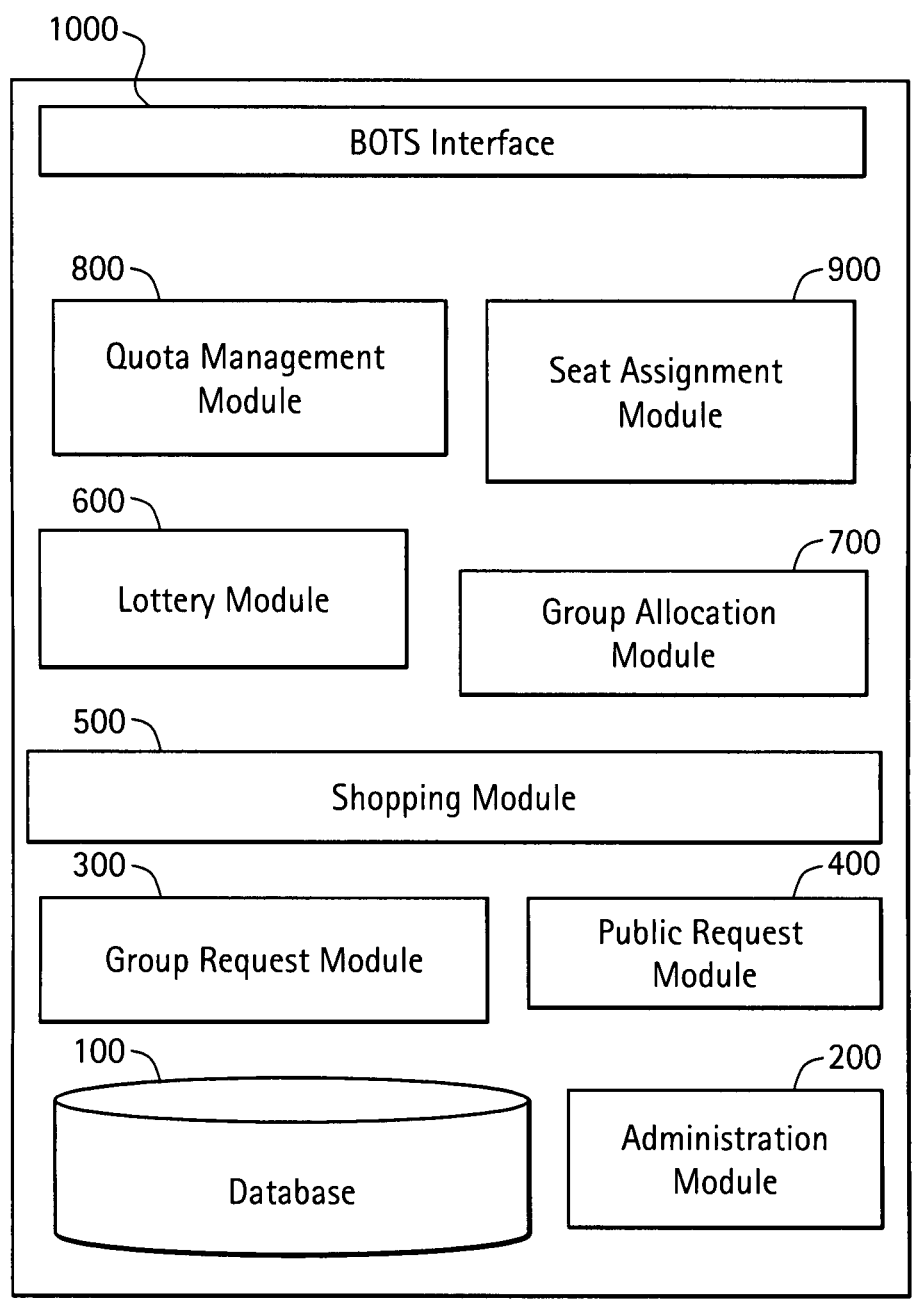

FIG. 3 tickets.com®

Home | System Setup | Program Setup | Account Management | Quota Management | Allocation Management | Fair Tix | Seat Allocation | Reporting    Welcome Thomas   Logout Program Setup Vancouver 2010 Winter Olympic ∨  [Change]

☐ Clusters
  ⊞ RICH-Richmond
  ⊟ VANC-Vancouver
    ⊟ BCP-BC Place Stadium
      Test Category
    ⊞ GMP-General Motors Place
    ⊞ HSP HillarestNat Bailey Stadium Paris
    ⊞ PCO-Pacific Coliseum
    ⊞ USC-UBC Winter Sports Center
  ⊞ WHIS-Whistler
  ⊞ WVAN-West Vancouver
⊞ Sessions
⊞ Sports Venue Cluster Translations [English ∨]  [Go]

Cluster Code *  [VANC]
Cluster Name *  [Vancouver]   Cluster Name

Add Cluster
Add Venue

[Save]  [Delete]

*tickets.com®*

Home | System Setup | Program Setup | Account Management | Quota Management | Allocation Management | Fair Tix | Seat Allocation | Reporting    ⊞ Welcome Thomas   Logout Program Setup Vancouver 2010 Winter Olympic ∨  [Change]

— 230

⊟ Clusters
⊞ Sessions
  ⊟ BIATH111
  ⊟ CERCLOS0 1
    ⊟ Test Category
      Adult
      Corporate Buyer
  ⊞ CEROPEN01
  ⊞ FIGURE111
  ⊞ FREEST111
  ⊞ HOCKEY111
  ⊞ HOCKEY112
  ⊞ HOCKEY113
  ⊞ HOCKEY114
  ⊞ LUGE 111

Session
Code *                  [CERCLOSED]
Venue Name *            [BG Race Stadium ∨]
Discipline Name *       [Closing Ceremony ∨]
Start Date *            [02/26/2010] 🗓
Start Time (HH:mm) *    [20:00]
End Date *              [03/28/2010] 🗓
End Time (HH:mm) *      [23:30]
Add Session
Add Subsession

[Save]    [Delete]

— 425 tickets.com®

Home | System Setup | Program Setup | Account Management | Quota Management | Allocation Management | Fair Tix | Seat Allocation | Reporting    ✉ Welcome Thomas   Logout

System Setup

☐ Buyer Types
   Adult
   Child
   Corporate Buyer
☒ Programs
☐ Ticket Categories Buyer Type Name *  [Adult]

Private *  ☐

Corporate ☐ add buyer type

[Save]   [Delete]

Translations [English ∨] [  ] [Go]

Name

FIG. 11

Rio 2007 Ticket Request | Order/History | Invoices | Payments | Reports

| Order | Type | Tickets | Value | Due |
|---|---|---|---|---|
| 145 | Request | 1253 | $17,655 | $2 |
| 549 | Changeorder | -79 | -$7,904 | -$7,904 |
| 421 | Supplemental | 120 | $9,550 | $9,550 |

[New Order]

| Invoice | Type | Due | Paid |
|---|---|---|---|

Account 1234
Atos-Origin SpA
Billing
Christine Berthaud
1400 rue Le Fromage 90210
Paris CEDEX
office: +34 123 45 67 89
mobile: +34 555 2323
fax: +34 567 88 00
Christine.berthaud@atos.fr
Shipping
Greg O'Connor
214 1/2 Bond Street London WC1
office: +34 123 45 67 89
mobile: +34 555 2323
fax: +34 567 88 00
greg@iluka.co9.uk
[Edit]

Order 145
Total Tickets 1253    [Pay]
Total value $17,655
Hi/Low ratio 2.5:1    [Invoice]
Order by ● Sport ○ Date/Time
Filter by [All Sports▼] [All Dates▼]

AQ1234 - Swimming    [Buyer Type▼]
M 500m free, W 1000m breast
15/7/2007   14:30-16:00
Homebush Acquatic Center
Category A @ $100 [0]
Category B @ $75 [0]
$2500    75
[Remove from cart]

CC7484 Ceremony    [Buyer Type▼]
Closing Ceremony
15/7/2007   14:30-16:00
Wembley Stadium
Category A @ $900 [0]
Category B @ $750 [0]
Category C @ $525 [0]
$14,500   75
[Remove from cart]

AQ1234 - Swimming    [Buyer Type▼]

SALT LAKE 2002
tickets.com plan your Olympic Experience | request tickets

SALT LAKE PARALYMPICS 2002

Salt Lake 2002 Paralympic Winter Games

CULTURAL OLYMPIAD

SALT LAKE 2002

Salt Lake 2002 Cultural Olympiad steps
| 1 login | 2 search & select | 3 view preferred list | 4 choose quantity & price | 5 choose alternates | 6 ticket request recap | 7 accept terms & conditions | 8 select method of payment | 9 ticket request confirmation | help | log in registered users log in here username [ ]
password [ ]
need help with your password?

[ log in ]

new users create an account here please enter your name, zip code and e-mail

First name [ ]
Last Name [ ]
Zip Code [ ]
E-mail Address [ ]
E-mail Address [ ]
(again for verification)

please enter a username and password
Usernames and passwords must be between 4 and 20 characters long.

Username [ ]
Password [ ]
Password [ ]
(again for vertification)

[ create my account ]

New for 2002!

Olympic Experience Packages

Lorem ipsum dolor sit amet, conse ctetuer adipiscing elit, sed diem n onummy nibh euismod tincisdunt ut lacreet dolore magnaaliguam e rat volupat. Lorem ipsum dolor

Here's a sample package:
- Bobsled
- Ice Skating
- Cross Country Skiing

Lorem ipsum dolor sit amet, conse ctetuer adipiscing elit, sed diem n tell me more

About the ticket buying process...

Lorem ipsum dolor sit amet, conse ctetuer adipiscing elit, sed diem n onummy nibh euismod tincisdunt ut lacreet dolore magnaaliguam e tell me more

FIG. 13      420

SALT LAKE 2002      tickets.com plan your Olympic Experience | request tickets steps

| 1 | 2 | 3 | 4 | 5 | 6 | 7 | 8 | 9 | ? |
|---|---|---|---|---|---|---|---|---|---|
| login | search & select | view preferred list | choose quantity & price | choose alternates | ticket request | accept terms & conditions | select method of payment | ticket request confirmation | help |

SALT LAKE PARALYMPICS 2002

Salt Lake 2002 Paralympic Winter Games

CULTURAL OLYMPIAD

SALT LAKE 2002

Salt Lake 2002 Cultural Olympiad search for events by date

The day and date for the current list is displayed on the upper left-hand corner of the page. You can switch between specific dates by using the date row to the right of the current day and date. Each date will display a list of the events sorted by the start time. If you would like to add an event to your preferred list check the box to the left of the event list. Please note, some events are only available as part of an Olympic Experience Package. Package details can be found by clicking the package icon. Please refer to the legend at the bottom of the page for a definition of each icon. Click on any event to see more detailed event information.

Saturday, Feb 16 fri sat sun mon tue wed thu fri [sat] sun mon tue wed thu fri sat sun
8  9  10  11  12  13  14  15  16   17  18  19  20  21 22 23 24

| add to my list | date | event | start / end (MST) | venue |
|---|---|---|---|---|
| ☐ | Sat. Feb. 16 | W Curling | 09:00 - 12:00 | The Ice Sheet at Ogden |
| ☐ | Sat. Feb. 16 | M Super G | 10:00 - 11:30 | Snowbasin Ski Area |
| ☐ | Sat. Feb. 16 | M / W Biathlon | 10:00 - 14:00 | Soldier Hollow |
| ☐ | Sat. Feb. 16 | M / W Freestyle Aerials | 10:00 - 15:00 | Deer Valley Resort |
| ☐ | Sat. Feb. 16 | W Ice Hockey | 11:00 - 13:30 | 'E3' Center |
| ☐ pkg. only | Sat. Feb. 16 | M Speed Skating | 13:00 - 15:00 | Utah Olympic Oval |
| ☐ | Sat. Feb. 16 | W Ice Hockey | 13:00 - 15:30 | The Peaks Ice Arena |
| ☐ | Sat. Feb. 16 | M Curling | 14:00 - 17:00 | The Ice Sheet at Ogden |
| ☐ pkg. only | Sat. Feb. 16 | Bobsleigh | 15:00 - 18:00 | Utah Olympic Park |
| ☐ | Sat. Feb. 16 | M Ice Hockey | 16:00 - 18:30 | 'E' Center |
| ☐ | Sat. Feb. 16 | M / W Short Track Speed Skating | 18:00 - 21:00 | Salt Lake Ice Center |
| ☐ | Sat. Feb. 16 | M / W Short Track Speed Skating (partial view) | 18:00 - 21:00 | Salt Lake Ice Center |
| ☐ | Sat. Feb. 16 | W Ice Hockey | 19:00 - 21:30 | The Peaks Ice Arena |
| ☐ pkg. only | Sat. Feb. 16 | W Curling | 19:00 - 22:00 | The Ice Sheet at Ogden |
| ☐ | Sat. Feb. 16 | M Ice Hockey | 21:30 - 23:50 | 'E' Center |

⚒ This event is available in an OEP. Click on the icon for more details.
⚒ There is a ticket limit for this OEP. The maximum number of tickets you may request is indicated on the center ticket.
⚒ Due to popularity, these tickets may be allocated by Virtual Wristband™ Click on the icon for more details.

[ < previous ] [ continue > ]

FIG. 14 — 430 search for Olympic Experience Packages

The Olympic Experience Packages (OEP) are a great way to see a variety of events and not end up with gaps in your schedule. To search for an OEP, please check the box to the left of the sports(s) of your choice. Your results will include all OEP(s) that contain the sports(s) you selected. If you wish, you may narrow your search to a specific range of dates, by using the pull down calender below. If you do not choose a date or date range all Olympic Experience Packages for the sports(s) you selected will be shown. Searches will result in a list of the Olympic Experience Packages in chronological order. First by date of the event, then by the start time of the first event in an OEP.

check the events that interest you - required

Ceremonies
☐ Opening Ceremony
☐ Closing Ceremony

Sports
| | | | |
|---|---|---|---|
| ☐ Biathlon | ☐ Downhill | ☐ Ice Hockey | ☐ Ski Jumping |
| ☐ Bobsleigh | ☐ Figure Skating | ☐ Luge | ☐ Slalom |
| ☐ Combined Slalom | ☐ Freestyle Aerials | ☐ Nordic Combined | ☐ Snowboarding |
| ☐ Cross Country | ☐ Freestyle Moguls | ☐ Short Track Speed Skating | ☐ Speed Skating |
| ☐ Curling | ☐ Giant Slalom | ☐ Skeleton | ☐ Super G | what dates are you looking for? - optional

One day only: [Fri. Feb. 8 ▽]

Or a range from: [Choose a date ▽]  to: [Choose a date ▽]

Click the icon to choose dates from a calender.

[< previous]  [continue >]

[Clear page to re-enter info]

SALT LAKE 2002 tickets.com

[plan your Olympic Experience] [request tickets]

SALT LAKE PARALYMPICS 2002

Salt Lake 2002 Paralympic Winter Games

CULTURAL OLYMPIAD

SALT LAKE 2002

Salt Lake 2002 Cultural Olympiad steps
| 1 | 2 | 3 | 4 | 5 | 6 | 7 | 8 | 9 | |
|---|---|---|---|---|---|---|---|---|---|
| login | search & select | view preferred list | choose quantity & price | choose alternates | ticket request recap | accept terms & conditions | select method of payment | ticket request confirmation | help | choose quantity and price

Choose the number of tickets and price per ticket using the pull-down menus below. Your total will automatically update as you make your choices. To remove an event from your primary choice list, click on the box next to the selection you wish to remove. The "Subtotal" and "Total" will not include any events you have checked to remove.

Olympic Experience Packages

| remove from total | date/time (MST) | event | venue | # of tickets | ticket price | event total |
|---|---|---|---|---|---|---|
| ☐ | OEP 1 | | | 4 ▾ | $990 ▾ | $3960 |
| | Fri. Feb. 8 18:00 - 21:00 | Opening Ceremony | Rice-Eccles Olympic Stadium | | | |
| | Sat. Feb. 9 09:00 - 13:00 | M / W Cross Country | Soldier Hollow | | | |
| | Sat. Feb. 9 19:00 - 22:00 | Medals Plaza Award Ceremony | Medals Plaza | | | |
| | Sun. Feb. 10 10:00 - 14:00 | W Snowboarding | Park City Mountain Resort | | | |
| | Sun. Feb. 10 19:00 - 21:30 | M Ice Hockey | E Center | | | |
| ☐ | OEP 3 | | | 4 ▾ | $490 ▾ | $1960 |
| | Sat. Feb. 9 21:00 - 23:30 | M Ice Hockey | E Center | | | |
| | Sun. Feb. 10 10:00 - 11:30 | M Downhill | Snowbasin Ski Area | | | |
| | Sun. Feb 10 19:00 - 22:00 | M Plaza Award Ceremony | Medals Plaza | | | |
| | Mon. Feb. 11 10:30 - 15:00 | M & Womens Biathlon | Soldier Hollow | | | |
| | Sun. Feb. 11 17:45 - 21:30 | Pairs Figure Skating | Salt Lake Ice Center | | | |

FIG. 15B

Single Events

| remove from total | date/ time (MST) | event | venue | | # of tickets | ticket price | event total |
|---|---|---|---|---|---|---|---|
| ☐ | Fri. Feb. 8 18:00 - 21:00 | Opening Ceremony | Rice = Eccles Olympic Stadium | ⚘ ▭ ✥ | 2 ▼ | $885 ▼ | $1770 |
| ☐ | Sun. Feb. 10 10:00 - 11:30 | M Downhill | Snowbasin Ski Area | ✥ | 2 ▼ | $95 ▼ | $190 |
| ☐ | Mon. Feb. 11 9:00 - 12:00 | M Curling | The Ice Sheet at Ogden | | 2 ▼ | $35 ▼ | $70 |
| ☐ | Mon. Feb. 11 10:00 - 11:30 | W Downhill | Snowbasin Ski Area | ✥ | 2 ▼ | $95 ▼ | $190 |
| ☐ | Mon. Feb. 11 10:30 - 15:00 | M / W Biathlon | Soldier Hollow | ✥ | 2 ▼ | $50 ▼ | $100 |

✥ This event is available in an OEP. Click on the icon for more details.

✥ There is a ticket limit for this OEP. The maximum number of tickets you may request is indicated on the center ticket.

✥ There is a ticket limit for this OEP. The maximum number of tickets you may request is indicated on the ticket.

⚘ Due to popularity, these tickets may be allocated by Virtual Wristband™ Click on the icon for more details sub total: $8240
processing fee: $25
total: $8265

[< previous] [continue >]

FIG. 16A

SALT LAKE 2002
SALT LAKE PARALYMPICS 2002

Salt Lake 2002 Paralympic Winter Games

CULTURAL OLYMPIAD

SALT LAKE 2002

Salt Lake 2002 Cultural Olympiad

*tickets.com* plan your Olympic Experience | request tickets steps

| 1 | 2 | 3 | 4 | 5 | 6 | 7 | 8 | 9 | |
|---|---|---|---|---|---|---|---|---|---|
| login | search & select | view preferred list | choose quantity & price | choose alternates | ticket request recap | accept terms & conditions | select method of payment | ticket request confirmation | help | ticket request recap  your list contains: 2 Olympic Experience 5 events

Please review your Ticket Request List for Accuracy. If everything is in order, click "Continue". If you would like to make changes, click "Previous" to the Choosing Alternates step to make revisions. Please note that each event has a link for individuals requiring special seating consideration.

Olympic Experience Packages on your list

| date/ time (MST) | preferred list | # of tickets | ticket price | event total | alternate |
|---|---|---|---|---|---|
| OEP 1 | | 4 | $990 | $3960 | no alternate chosen |
| Fri. Feb. 8 18:00 - 21:00 | Opening Ceremony Rice-Eccles Olympic Stadium | | | | |
| Sat. Feb. 9 09:00 - 13:00 | M / W Cross Country Soldier Hollow | | | | |
| Sat. Feb. 9 19:00 - 22:00 | Medals Plaza Award Ceremony Medals Plaza | | | | |
| Sun. Feb. 10 10:00 - 14:00 | W Snowboarding Park City Mountain Resort | | | | |
| Sun. Feb. 10 19:00 - 21:30 | M Ice Hockey E Center | | | | |

| OEP 3 | | (OEP 5) | | 4 | $990 | $1960 |
|---|---|---|---|---|---|---|
| Sat. Feb. 9 21:00 - 23:30 | M Ice Hockey E Center | Sat. Feb. 9 09:00 - 13:30 | M / W Cross Country Soldier Hollow | | | |
| Sun. Feb. 10 10:00 - 11:30 | M Downhill Snowbasin Ski Area | Sat. Feb. 9 17:45 - 21:30 | Pairs Figure Skating Salt Lake Ice Center | | | |
| Sun. Feb 10 19:00 - 22:00 | M Plaza Award Ceremony Medals Plaza | Sun. Feb 10 10:00 - 11:30 | M Downhill Snowbasin Ski Area | | | |
| Mon. Feb. 11 10:30 - 15:00 | M & Womens Biathlon Soldier Hollow | Mon. Feb. 10 19:00 - 22:00 | Medals Plaza Award Ceremony Medals Plaza | | | |
| Sun. Feb. 11 17:45 - 21:30 | Pairs Figure Skating Salt Lake Ice Center | Sun. Feb. 11 11:00 - 13:30 | W Ice Hockey E Center | | | |

FIG. 17 billing information and payment method
Please complete all the information below and select a method of payment.

Billing Address - required
Title
[Mr. ▽]
First Name                MI
Last Name
Address 1
Address 2                 Apt./Suite
City                      State
                          [AK ▽]
ZIP Code

Shipping Adress (if different than billing)
Shipping address must be a valid US street address. Tickets will not be delivered outside the US or to a Post Office box
Title
[Mr. ▽]
First Name                MI
Last Name
Address 1
Address 2                 Apt./Suite
City                      State
                          [AK ▽]
ZIP Code

Contact Information
Day Phone    Evening Phone    Email

How will you be paying?

online
○ VISA
Full name as it appears on credit card
Credit Card Number
Expiration Date
[Jun ▽] [2000 ▽]

offline
○ check / money order / cashier's check
(print confirmation and mail it with check)

○ offline credit card
(print confirmation and mail it with written credit card information.)

Get a visa card in just five minutes! click here

[< previous]  [continue >]

steps: 1 login | 2 search & select | 3 view preferred list | 4 choose quantity & price | 5 choose alternates | 6 ticket request recap | 7 accept terms & conditions | 8 select method of payment | 9 ticket request confirmation SALT LAKE 2002
SALT LAKE PARALYMPICS 2002
Salt Lake 2002 Paralympic Winter Games
CULTURAL OLYMPIAD
SALT LAKE 2002
Salt Lake 2002 Cultural Olympiad tickets.com plan your Olympic Experience | request tickets

FIG. 18A

SALT LAKE 2002 — tickets.com plan your Olympic Experience | request tickets steps

| 1 | 2 | 3 | 4 | 5 | 6 | 7 | 8 | 9 | |
|---|---|---|---|---|---|---|---|---|---|
| login | search & select | view preferred list | choose quantity & price | choose alternates | ticket request recap | accept terms & conditions | select method of payment | ticket request confirmation | help |

SALT LAKE PARALYMPICS 2002

Salt Lake 2002 Paralympic Winter Games

CULTURAL OLYMPIAD

SALT LAKE 2002

Salt Lake 2002 Cultural Olympiad verify request and print

Please verify your order and print a copy for your records.

Olympic Experience Packages on your list

| date/ time (MST) | preferred list | # of tickets | ticket price | event total | alternate |
|---|---|---|---|---|---|
| OEP 1 | | 4 | $990 | $3960 | no alternate chosen |
| Fri. Feb. 8 18:00 - 21:00 | Opening Ceremony Rice-Eccles Olympic Stadium | | | | |
| Sat. Feb. 9 09:00 - 13:00 | M / W Cross Country Soldier Hollow | | | | |
| Sat. Feb. 9 19:00 - 22:00 | Medals Plaza Award Ceremony Medals Plaza | | | | |
| Sun. Feb. 10 10:00 - 14:00 | W Snowboarding Park City Mountain Resort | | | | |
| Sun. Feb. 10 19:00 - 21:30 | M Ice Hockey E Center | | | | |

| OEP 3 | | 4 | $990 | $1960 | (OEP 5) |
|---|---|---|---|---|---|
| Sat. Feb. 9 21:00 - 23:30 | M Ice Hockey E Center | | Sat. Feb. 9 09:00 - 13:30 | M / W Cross Country Soldier Hollow | |
| Sun. Feb. 10 10:00 - 11:30 | M Downhill Snowbasin Ski Area | | Sat. Feb. 9 17:45 - 21:30 | Pairs Figure Skating Salt Lake Ice Center | |
| Sun. Feb 10 19:00 - 22:00 | M Plaza Award Ceremony Medals Plaza | | Sun. Feb 10 10:00 - 11:30 | M Downhill Snowbasin Ski Area | |
| Mon. Feb. 11 10:30 - 15:00 | M & Womens Biathlon Soldier Hollow | | Mon. Feb. 10 19:00 - 22:00 | Medals Plaza Award Ceremony Medals Plaza | |
| Sun. Feb. 11 17:45 - 21:30 | Pairs Figure Skating Salt Lake Ice Center | | Sun. Feb. 11 11:00 - 13:30 | W Ice Hockey E Center | |

FIG. 18B

Single Events tickets on your list ✏️

| date/<br>time (MST) | preffered list | # of<br>tickets | ticket<br>price | event<br>total | alternate | | wild<br>card |
|---|---|---|---|---|---|---|---|
| Fri. Feb. 8 ♿<br>18:00 - 21:00 | Opening Ceremony<br>Rice - Eccles Olympic<br>Stadium | 2 | $885 | $1770 | Sun. Feb. 24<br>18:00 - 21:00 | Closing Ceremony<br>Rice - Eccles Olympic<br>Stadium | ☐ |
| Sun. Feb. 10 ♿<br>10:00 - 11:30 | M Downhill<br>Snowbasin Ski Area | 2 | $95 | $190 | choose alternate | | ☐ |
| Mon. Feb. 11 ♿<br>9:00 - 12:00 | M Curling<br>The Ice Sheet at Ogden | 2 | $35 | $70 | Mon. Feb. 11<br>14:00 - 17:00 | M Curling<br>The Ice Sheet at Ogden | ☐ |
| Mon. Feb. 11 ♿<br>10:00 - 11:30 | W Downhill<br>Snowbasin Ski Area | 2 | $95 | $190 | no alternate chosen | | ☐ |
| Mon. Feb. 11 ♿<br>10:30 - 15:00 | M / W Biathlon<br>Soldier Hollow | 2 | $50 | $100 | Sat. Feb. 9<br>09:00 - 13:00 | M/W Cross Country<br>Soldier Hollow | ☒ |

♿ Click icon for disabled seating sub total: $8240
processing fee: $25 total: $8265 your confirmation code is: 512002 billing & shipping info

Billing Address
Mr. John Tebaldi
257 East 200 South, Suite 600
Salt Lake City, UT 84111-2002

Shipping Address
Same as Billing

Day Phone
801-212-2521

Evening Phone
801-364-7644

Email
john.tebaldi@sic2002.org

[ Print this order ]

FIG. 20

FIG. 22 tickets.com®  | Home | View Events | Check out | My Account |   Welcome Aaron   Logout Vancouver 2010 Winter Olympics ▼ Change Start 02/10/2010   End 02/26/2010

Choose Discipline of Interest

⊞ Ceremonies
   Closing Ceremony
   Opening Ceremony
⊞ Figure Skating
⊞ Freestyle Skiing
⊞ Ice Hockey
⊞ Luge
⊞ Nordic Combined
⊞ Ski Jumping
⊞ Speed Skating ⊟ February 10th, 2010
  ☐ 08:00PM - 10:30PM
   Ceremonies: Opening Ceremony
   Test Category, Adult - $35.00
   Test Category, Corporate Buyer
   - $25.50
⊟ February 26th, 2010
  ☐ 08:00PM - 11:30PM
   Ceremonies: Closing Ceremony
   Test Category, Corporate Buyer
   - $25.50
   Test Category, Adult - $35.00

510

Shopping Cart 🛒

February 10th, 2010          ✕
08:00PM - 10:30PM
Ceremonies: Opening Ceremony
Test Category, Adult
Total Price:$35
Price per Item: $35
Quantity: [1]

February 26th, 2010          ✕
08:00PM - 11:30PM
Ceremonies: Closing Ceremony
Test Category, Adult
Total Price:$35.5
Price per Item: $35.5
Quantity: [1]

520

Maximum Cart Price: $35.5

[Clear Cart]   [Check Out]

[Clear All]   [Select All]

FIG. 23 tickets.com®
Home | Allocation Management | Seat Allocation | My Account          Welcome John   Logout

Allocation Management

Rec 2007 Pan-American Games [v] [Change]

☐ Aquatics
  ☐ Open Water
    AQUAMARO1
  ☐ Swimming
☐ Ceremonies

[Filter Accounts]

| Accounts | | AQUAMARD1 |
|---|---|---|
| | | Test Category |
| International Sponsors | | [0] 🗁 |
| Unallocated | | [0] |
| Bank of America | 🗁 | [0] /0 |
| Atos-Origin | 🗁 | [0] /0 |
| John Hancock Manulife | 🗁 | [0] /0 |
| Home Depot | 🗁 | [0] /0 |
| The Coca Cola Company | 🗁 | [0] /0 |
| Velaregen AG | 🗁 | [0] /0 |
| McDonald's | 🗁 | [0] /0 |
| Lenovo Intl | 🗁 | [0] /0 |

[Select All]    [Reset]    [Save]
[Clear All]

FIG. 25A

COMPUTER IMPLEMENTED METHOD FOR MANAGING ELECTRONIC TICKET REQUESTS

FIELD OF THE INVENTION

The present invention relates generally to a computer implemented method and system and computer readable medium for facilitating the electronic purchase of tickets for an event. More specifically, the present invention is directed to a computer implemented method and system and computer readable medium for managing the purchase and allocation of tickets and packages of tickets for spectator events.

BACKGROUND

The following description of the background of the invention is provided simply as an aid in understanding the invention and is not admitted to describe or constitute prior art to the invention.

The ticketing process for large sporting events is generally a long and complex process. For example, ticket sales for large sporting events may begin well in advance of the construction of the sporting venue, before seating quantities are known and/or before seating configurations are established. Further, sporting event organizers may sell tickets to a variety of types of patrons or "market segments." For example, ticket organizers may allocate and sell tickets to the local public, corporate sponsors, other interested groups and organizations (e.g., broadcasters, sports governing bodies) and the international public.

In order to facilitate the sale of an unknown quantity of tickets to various tiers of patrons, event organizers generally sell tickets in phases. These phases govern the purchasing process for each of the different market segments. For example, during the first group sales phase, sponsors are able to submit their initial ticket request. During the second group sales phase, available tickets are allocated to sponsors based on their initial requests. Other phases govern ticket sales for different market segments. During the first public ticketing phase, for example, general public customers can formulate a ticket request to submit in the lottery/balloting process. Different ticketing phases may overlap or run concurrently. For example, the group sales request phase may coincide, in part, with the public request phase. After the request phases are complete (for both group and public market segments) tickets for the most popular events are allocated (proportionally for groups) or awarded (using a lottery/balloting procedure for public sales) to individual patrons or groups. Near the end of the ticketing process, the organizer must match up allocated and awarded tickets with actual ticket inventory, assigning specific seats to each customer. Once seats have been assigned, ticket orders can be printed and fulfilled.

In order to execute a ticketing program as outlined above, organizers schedule the various ticketing phases to best meet their needs, scheduling, and local market conditions. Separate ticketing methodologies and systems are employed for allocating tickets. The use of separate systems and methodologies requires massive coordination and the use of an enormous amount of human resources to ensure that tickets are allocated appropriately. Another factor that complicates the organization and execution of ticketing programs for large sporting events is the transitory nature of the various organizing committees charged with organizing and facilitating the events. Most events of this scale are organized by local committees, with varying levels of input and oversight by the international bodies, staffed by temporary employees, often with limited experience organizing similar events.

Accordingly, there is a need for a stable, unified platform for delivering ticketing services to large-scale events that can be easily adapted for various types of events, including events in which tickets are allocated to different groups prior to fulfillment. Further, there is a need for a system and method that allows various types of patrons (i.e., organizational bodies, corporate organizations, individuals, etc.) to request and order tickets to multiple events in advance. In addition, once scheduling of events is finalized, a system is needed to dynamically allocate requested tickets to patrons based on a predetermined set of criteria.

SUMMARY

According to one embodiment, a computer implemented method for managing electronic requests, includes providing a shopping module for receiving and storing user requests, receiving at least one primary request for an event and storing the primary request in the shopping module, providing an option for requesting an alternate request to the user, receiving at least one alternate request for an event and storing the alternative request in the shopping module, and allocating events to a user based on the primary request and possible alternative request selections, wherein if the events designated by the primary request are available, the primary request is fulfilled and the alternative request(s) is fulfilled, pending availability, if the events designated by the primary request are not available.

According to another embodiment of the invention, a ticketing management system, includes a request management system, configured to receive ticket requests and allocate tickets to purchasers, a back-end office ticketing system, configured to record ticket requests and a fulfillment center configured to receive the ticket requests from the back-end office ticketing system and print and deliver the tickets to the purchasers.

According to yet another embodiment of the invention, a request management system includes a database for storing ticket and event information, a public request module, configured to receive and process ticket request from individuals, a group request module, configured to receive and process requests for group tickets, a shopping module, configured to track individual and group ticket requests, an allocation module allocating tickets to group users based on received ticket requests, and a lottery or balloting module used to award tickets to public purchasers.

According to still another embodiment of the invention, a computer program product for managing item sales, embodied in a computer readable medium, includes computer code for providing a shopping module to a user, computer code for providing and receiving at least one primary request for an item and storing the primary request in the shopping module, computer code for providing and receiving zero or more alternate requests for an item and storing the alternative request(s) in the shopping module and computer code for providing for the allocation of items to a user based on the primary request and alternative request selections, wherein if the items designated by the primary request are available the primary request is fulfilled and the alternative request(s) is fulfilled, pending availability, if the items designated by the primary request are not available.

According to an embodiment of the invention, a system for managing event requests, includes a client terminal for placing user requests and a server, operably connected to the client terminal, including a processor for processing information and a memory unit. The memory unit includes a computer program product, embodied in a computer readable medium, which when executed performs a method, including providing a shopping module for receiving and storing user requests to the client terminal, receiving at least one primary request for an event from the client terminal and storing the primary request in the shopping module, providing an option for requesting an alternate request to the client terminal, receiving at least one alternate request for an event from the client terminal and storing the alternative request in the shopping module; and allocating events to a user based on the primary request and possible alternative request selections, wherein if the events designated by the primary request are available, the primary request is fulfilled and the alternative request(s) is fulfilled, pending availability, if the events designated by the primary request are not available.

According to another embodiment of the invention, a ticketing management system includes a first server, having a request management system, configured to receive ticket requests and allocate tickets to purchasers, a second server, having a back-end office ticketing system, configured to record ticket requests and a fulfillment center configured to receive the ticket requests from the back-end office ticketing system and deliver the tickets to the purchasers.

According to still another embodiment of the invention, a ticket request management server, includes a database for storing ticket and event information, a processor for processing information and a memory unit, including a computer program product, embodied in a computer readable medium, comprising a public request module, configured to receive and process ticket request from individuals, a group request module, configured to receive and process requests for group tickets, a shopping module, configured to track individual and group ticket requests and an allocation module allocating tickets to individuals and groups users based on received ticket requests.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

FIG. 2 is a block diagram of a request management system according to one embodiment of the invention.

FIGS. 3-5 are user interfaces for a request management system administrative module according to one embodiment of the invention.

FIGS. 7-10 are user interfaces for a request management system administrative module according to one embodiment of the invention.

FIG. 11 is a user interface for a request management system group request module according to one embodiment of the invention.

FIGS. 12-18 are user interfaces for a request management system public request module according to one embodiment of the invention.

FIGS. 19-22 are user interfaces for a shopping module according to one embodiment of the invention.

FIG. 23 is a user interface for a request management system group allocation module according to one embodiment of the invention.

FIGS. 25(a)-25(b) are user interfaces for a request management system quota management module.

DETAILED DESCRIPTION

Figure 1A:
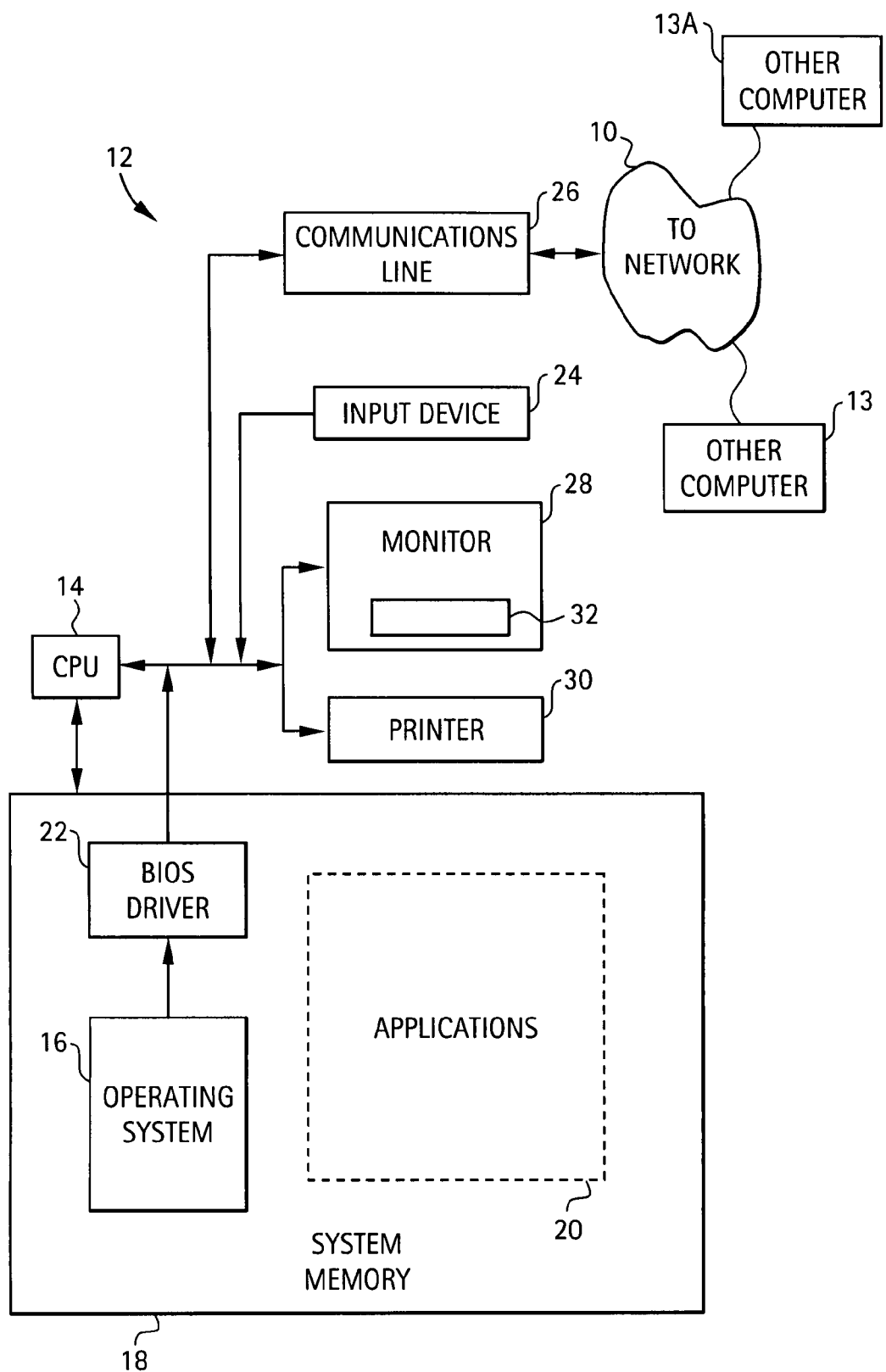
FIG. 1(a) is a system diagram of a ticketing management system according to one embodiment of the invention.

Embodiments of the present invention will be described below with reference to the accompanying drawings. It should be understood that the following description is intended to describe exemplary embodiments of the invention, and not to limit the invention.

In a general aspect, the present invention provides a system, a computer implemented method, and a computer readable medium storing software that provides purchasing services (e.g., ticket sales) for complex goods and events to several different types of customers.

Embodiments within the scope of the present invention include program products comprising computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM or other optical disk storage, magnetic disk storage or other magnetic storage devices, or any other medium which can be used to carry or store desired program code in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above are also to be included within the scope of computer-readable media. Computer-executable instructions comprise, for example, instructions and data which cause a general purpose computer, special purpose computer, or special purpose processing device to perform a certain function or group of functions.

In addition to a system, the invention is described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

The present invention in some embodiments, may be operated in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet. Those skilled in the art will appreciate that such network computing environments will typically encompass many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing device in the form of a conventional computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The drives and their associated computer-readable media provide nonvolatile storage of computer-executable instructions, data structures, program modules and other data for the computer.

Software and Web implementations of the present invention could be accomplished with standard programming techniques with rule based logic and other logic to accomplish the various database searching steps, correlation steps, comparison steps and decision steps. It should also be noted that the words "component" or "module" as used herein and in the claims is intended to encompass implementations using one or more lines of software code, and/or hardware implementations, and/or equipment for receiving manual inputs.

FIG. 1(a) illustrates the components of a general purpose computing system connected to a general purpose electronic network 10, such as a computer network. The computer network can be a virtual private network or a public network, such as the Internet. As shown in FIG. 1(a), the computer system 12 includes a central processing unit (CPU) 14 connected to a system memory 18. The system memory 18 typically contains an operating system 16, a BIOS driver 22, and application programs 20. In addition, the computer system 12 contains input devices 24 such as a mouse or a keyboard 32, and output devices such as a printer 30 and a display monitor 28, and a permanent data store, such as a database 21. The computer system generally includes a communications interface 26, such as an ethernet card, to communicate to the electronic network 10. Other computer systems 13 and 13A also connect to the electronic network 10 which can be implemented as a Wide Area Network (WAN) or as an internetwork, such as the Internet. Data is stored either in many local repositories and synchronized with a central warehouse optimized for queries and for reporting, or is stored centrally in a dual use database.

According to one potential implementation, the present invention may be applied to facilitate ticketing for large sporting events, such as the Olympics, Commonwealth Games, FIFA World Cup, etc. It will be appreciated, however, that the invention may be applied advantageously for ticketing of other events.

Large sporting events generally follow a ticket sales model unique in the industry, and as such, specialized applications and services must be utilized to successfully execute a ticketing program. Ticketing world sporting events is complicated by a number of factors, most significantly the fact that sales commence long before the construction of the host venues is complete, often even before seating quantities and configurations are established. The international nature of such events and international clientele also complicate the ticketing process.

Ticketing programs for such events follow what is referred to herein as a "Games Model." Ticket allocation for the Games Model are conducted in various phases and those phases may occur in different orders. Games Model ticketing phases follow two or more parallel tracks: one for ticket sales to the local public; and others for sales to various groups, sponsors, and international constituents. The ticketing phases can be generally identified as a group request phase, a public request phase, a group allocation phase, a group negotiation phase, a public lottery phase, a public add-on sales phase, a pre-event sales phase, a seat assignment phase, a group sub-seating phase, a ticket fulfillment phase, and a game-time sales phase.

Generally, during the group request phase sponsors, broadcasters, national and international governing bodies, and other stakeholder groups formulate and submit their requests for tickets to events.

During the public request phase, the general public can formulate and submit requests for tickets. In accordance with one feature of an embodiment of the present invention, when requesting tickets, the general public is allowed to request tickets for one or more alternative events, in case they are not successful in obtaining tickets for their preferred events. In addition, public purchasers may be allowed to opt for "cascading" for a particular event/sub-session in their request. Cascading signifies automatically upgrading or downgrading tickets to a different price level if seats are not available in the price category originally requested.

In the group allocation phase, a group of potential clients submit requests for tickets as a group. Once all group requests for a particular category of clients (or "market segment") have been received, available tickets are allocated to clients, based on a variety of factors. Once allocations have been established, an official communication is sent to the clients.

After clients receive notice of their ticket allocations, during the group negotiation phase, final allocations are generally negotiated with an organizing committee tasked with allocating tickets. After the public request phase ends, in the lottery phase, a lottery is conducted to award tickets for events/categories in which demand exceeds supply. The difference between the group allocation and public lottery phases lies in the fact that group requests for a particular event and price category (or subsession) may be allocated in part, whereas public requests for a particular event and price category must be satisfied or rejected in their entirety.

During the public add-on sales phase, once the lottery is complete, all public clients who participated in the request phase are able to purchase available tickets on a first-come, first-served basis. Once the add-on phase closes, the pre-game, unassigned real-time sales phase can begin in which ticket sales are open to the wider public. Ticket sales during this phase only specify a session and price category. The tickets purchased do not correspond to an actual session/row/seat.

In the seat assignment phase, once venue configurations are finalized, ticket sales are temporarily closed, and all previously sold/allocated tickets are assigned actual section/row/seat values. During the ticket fulfillment phase, tickets are printed, usually on souvenir stock, by an external printing house. Public tickets are shipped to clients via secure carrier and/or delivered to public distribution points, and group tickets are shipped to the organizing committee for specialized fulfillment. Finally, during the game-time/real-time sales phase ticket sales reopen, using reserved seating venues.

In the group sub-seating phase, seat assignments are communicated to group clients, who are then able to assign and group tickets amongst their constituents, prior to the sorting, printing, and fulfillment of ticket orders.

RMS and BOTS System

Figure 1B:
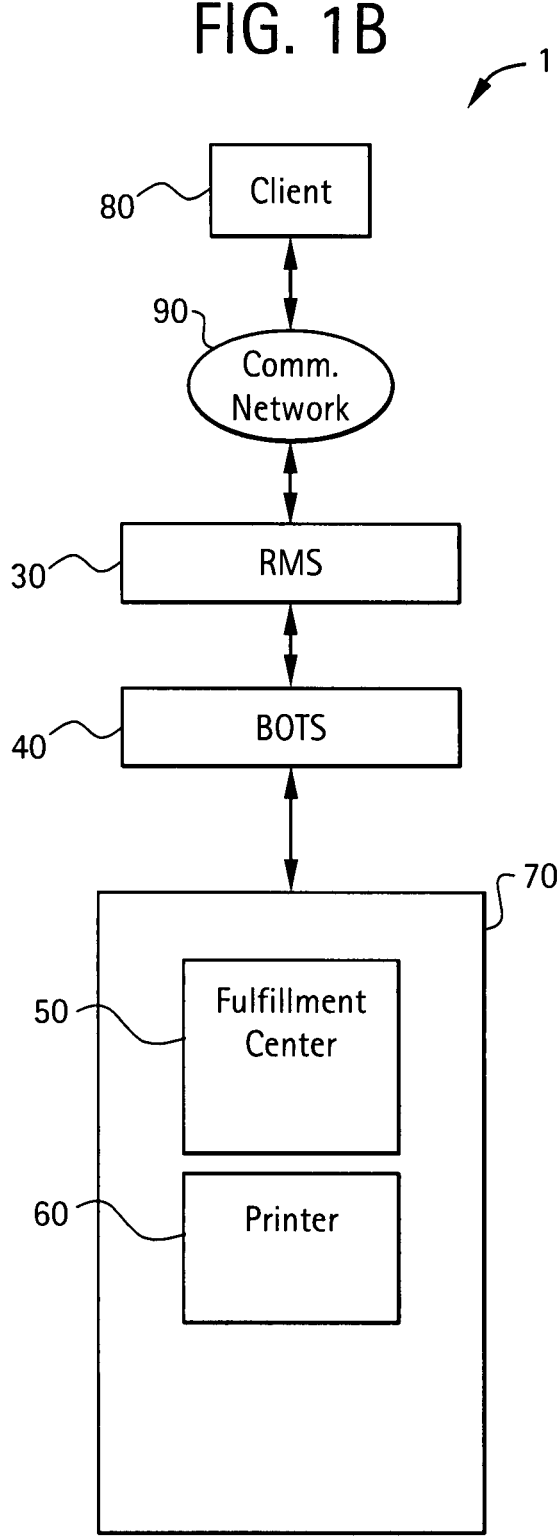
FIG. 1(b) is a block diagram for a ticketing management system according to one embodiment of the invention.

FIG. 1(b) shows a ticketing management system (TMS) 1 according to one embodiment of the invention. A client 80 connects to a request management system (RMS) 30 via a communication network 90 (e.g., the Internet). The RMS 30 can interface with a back-end office ticketing system ("BOTS") 40. The BOTS 40 interfaces with a fulfillment system 70. According to one embodiment, the fulfillment system 70 includes a fulfillment center 50 for receiving ticketing orders and a printer 60 for printing the purchased tickets. Both the RMS 30 and BOTS 40 can be implemented as a combination of hardware and software. Preferably, both the RMS 30 and BOTS 40 are servers. The RMS 30, BOTS 40 and fulfillment center 50 may be collocated or each may be at different locations and connected by conventional means known in the art.

In this embodiment, the RMS 30 allows a buyer (event admission purchaser) to request and purchase tickets for sale and interfaces to the BOTS 40. The RMS 30 also allows a user to perform more administrative functions as will be described in more detail below.

The BOTS 40 supports a database of information related to the sale items. In addition, the BOTS 40 can keep track of event admissions and sales.

As will be described in more detail below, the RMS 30 manages a Web server that allows the buyer to place an order for an item online. A buyer can purchase an item by making contact with the RMS 30 using a standard Web browser on a client machine over the Internet. According to one embodiment of the invention, tickets are requested by the entry of credit or debit card information, which is subject to an approval process. In the alternative, other various forms of electronic currency may be used to request tickets. In some case a prospective buyer is immediately charged a maximum amount for the requested items and refunded the difference for those items that are not allocated to the buyer. Alternatively, the buyer is not charged until the items are allocated to the buyer.

After purchasing, a query is sent to the BOTS 40 to record the ticket as purchased. Paper tickets are produced by the fulfillment center 70 and are sent to the user, for example, by FEDEX or U.S. mail. The fulfillment center 70 accesses the BOTS 40 over the network in any suitable manner, for example, using a terminal or client (non-server) machine such as a personal computer. After an item sale, information reflecting the item and address information of the buyer is reflected in the BOTS. Using the example of ticket sales, an actual paper ticket is generated and then delivered to the purchaser.

According to one embodiment the BOTS 40 can directly assist a user in purchasing tickets. For example, upon selection of an event using a "buy tickets" link, a description related to the venue will appear, which may include a layout of the venue and rules that are applicable to event admission. The buyer is then given, where appropriate for the venue, a list of admission price classes. The price classes usually relate to the section of the venue in which the corresponding seat is found. Upon selecting a price class or section, an algorithm is implemented to choose the best available seat and present information related to that seat to the buyer, such information usually including the admission type (e.g. adult, senior), the section, the row, the seat number, and the price. The best available seat is generated by examining the non-reserved seating, as known via a check with the BOTS against existing availability at that moment in time. HTML code for a table showing the "best available seat" is generated when a seat is requested based on BOTS database information. Only one seat is presented per the number of event admissions being purchased. This means that the buyer does not have the option to select from a variety of seats shown in a list, but rather must either accept the best available seat(s) presented, or have the system find different seats. Before the seat is presented to the buyer, it is recorded as reserved for a limited period of time, to allow the admission to be returned to the available pool if a buyer exits the system without explicitly canceling his order, and to prevent the same admission from being oversold.

RMS System Overview

FIG. 2 is a block diagram of the RMS 30 according to one embodiment of the invention. The RMS 30 illustrated in this embodiment includes several functional components and services that will be described in further detail below. In this example, these components include but are not limited to a database 100, an administration module 200, a public request module 400, a group request module 300, a shopping module 500, a lottery module 600, a group allocation module 700, a quota management module 800, a seat assignment module 900 and a BOTS interface 1000. The database 100 can be implemented in software and/or Web applications residing on hardware with standard programming techniques. Preferably, the database 100 is housed on a distinct computer such as a database server. The modules and interface (200, 400, 500, 600, 700, 800, 900 and 1000) encompass implementations using software code, and/or hardware implementations, and/or equipment for receiving manual inputs. One or more modules/interfaces may be stored and executed on hardware such as for example, an application server.

According to one embodiment of the invention, the RMS 30 is implemented using industry-standard/open-source Web-based technologies to provide for rapid development and ease of customization. According to one embodiment of the invention, the RMS 30 is built on top of a relational database 100 (e.g., mySQL, Oracle, or SQLServer), and utilizes Web-based user interface technologies such as Ajax, Flash, etc. In addition, the RMS 30 preferably provides support for multilingual interfaces and pricing in multiple currencies.

According to one embodiment of the invention, the database 100 provides a schema that is utilized to store data that is communicated to a prospective purchaser using the system of this embodiment. Preferably, the database 100 is an industry-standard relational Database Management System (DBMS). The database 100 stores data concerning the items for purchase, as well as well as purchaser data.

An example of some information that is stored in the database includes, but is not limited to, a buyer type (used to assign buyer types to orders/tickets), a buyer name, a cluster (allows for geographical grouping of venues for reporting purposes), a country (used for validation of countries and country code), a "discipline" or type of event (e.g., a particular competition discipline, such as, the "Long Jump"), a discipline name (allows for multilingual discipline names and descriptions), invoice information, language (languages supported by the system), market segment (used for classifying a patron account e.g., "Sponsor", "Public", etc.), news items (used by the client for updating content in the public request tool pages), order information (ticket orders/requests), alternate order information (the patrons second choice for a particular order line, used in the lottery process), order confirmation information (information) regarding tickets that were actually allocated/awarded, package associations (used for grouping sessions/events into packages), patron information, payment information such as payment type, quota (used to reserve inventory for use by a particular market segment), section information (used to divide a venue into different sections or price categories), session and subsession information (a specific event/competition for which tickets are issued), sport information (a grouping of disciplines (i.e. "Track-and-field", "Equestrian", etc.), ticket information, and venue information.

According to one embodiment of the invention, the RMS 30 includes an administration module 200. The administration module allows for back-office setup of all relevant information concerning an event. As illustrated in greater detail below, the administration module 200 allows a user to carry-out several tasks such as the insertion and modification of orders/requests, configuration of users, generation of reports, and provides administrative access to the other modules in the RMS 30.

The RMS 30 also includes a group request module 300 configured to allow group clients to formulate requests, submit change orders, and generate reports. Group clients are generally defined as organizations such as corporations or other entities that consist of more than one patron.

According to another embodiment of the invention, the RMS 30 includes a public request module 400. As described in detail below, the public request module 400 is a general public interface that allows potential customers to submit ticket requests, choose alternates, and check on the status of their order. Preferably, the public request module is a Web-based interface that allows public clients to register, browse and formulate a single request over multiple sessions (using the shopping module 500). In addition, the public request module 400 in conjunction with the shopping module 500 allows a user to designate primary and alternate events, and complete their order by finalizing their request and making payment arrangements.

A shopping module 500 facilitates the ordering and purchasing of tickets. The shopping module 500 exhibits dynamic behavior in that it is configured to allow primary and alternate selections to persist simultaneously. The subsequent processing and allocation of the items placed in the shopping module 500 is determined based on numerous item allocation processes, some of which are described in detail below.

According to one embodiment of the invention, the RMS 30 also includes a lottery module 600. The lottery module 600 conducts a random selection for items for which general public demand exceeds supply to determine which purchasers are awarded their desired items. Generally, public demand for certain items far outstrip the availability of those items. According to one embodiment of the invention, an equitable means for distributing tickets to public customers is employed. For example when demand exceeds supply, a random selection process determines to which clients the items will be awarded.

Similar to the lottery module 600, the RMS 30 includes a group allocation module 700 configured to allocate available inventory among group clients. Generally at the end of the group request phase (described above), demand exceeds supply in almost every market segment for popular items. In order to ensure an equitable distribution of high-demand items, the RMS 30 utilizes a group allocation module 700 which allocates items using any one of several methodologies/algorithms.

According to one embodiment of the invention, the RMS 30 uses a quota management module 800 to manage inventory, and guarantee certain distributions of items to various classes of clients. For example, an organizing committee of a Games-type event may wish to guarantee that the general public be allocated no less that 20% of the total available seats for any particular event, etc.

According to one embodiment of the invention, the RMS 30 includes a seat assignment module 900 that provides an interface for clients who will have no access to a BOTS 40 or reserved seating maps to assign seats. The seat assignment module 900 imports reserved seating inventory via a file or other means.

The seating assignment module allows the client to associate section/row/seat values with sold tickets. In addition to this feature being used for world events, the seat assignment module is used by clients for events like post-season/championship seat assignments, etc.

According to another embodiment of the invention, the RMS 30 includes a back office interface 1000 that allows the RMS 30 to transfer order/request information to a back office system. For example the RMS 30 can transfer order/request information to the BOTS 40 described above. Preferably, the RMS 30 and BOTS 40 systems are implemented using Web services that allow synchronization between the systems.

The above-referenced modules will now be described in greater detail below with reference to their associated user interfaces.

Administration Module
Event Setup

Figure 6:
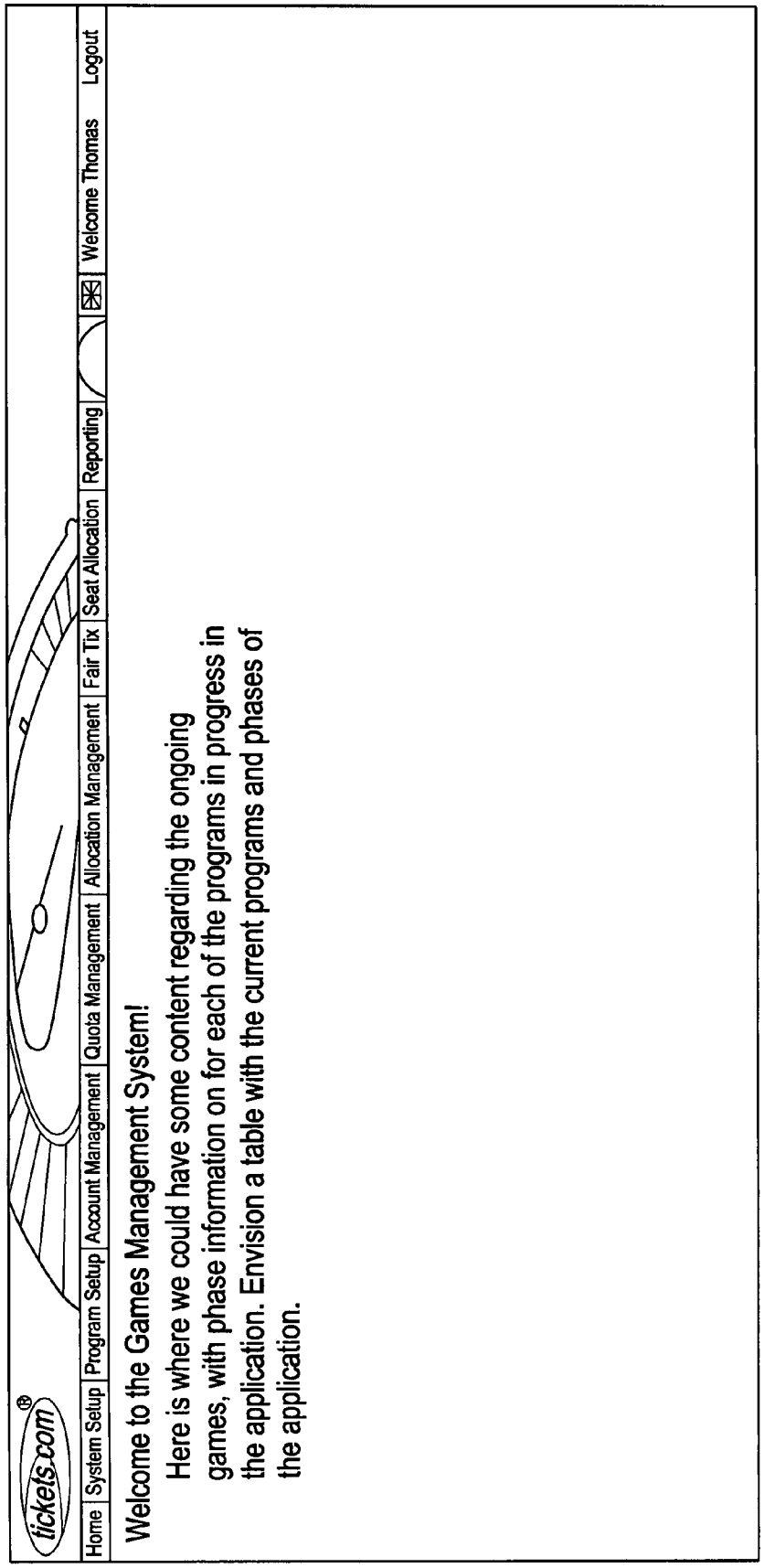
FIG. 6 is a screenshot of a request management system homepage according to one embodiment of the invention.

FIGS. 3-9 show user interfaces for the administration module 200. FIG. 6 is a screenshot of the RMS home page according to one embodiment. From this page, a user can navigate to any module described above.

Figure 4:
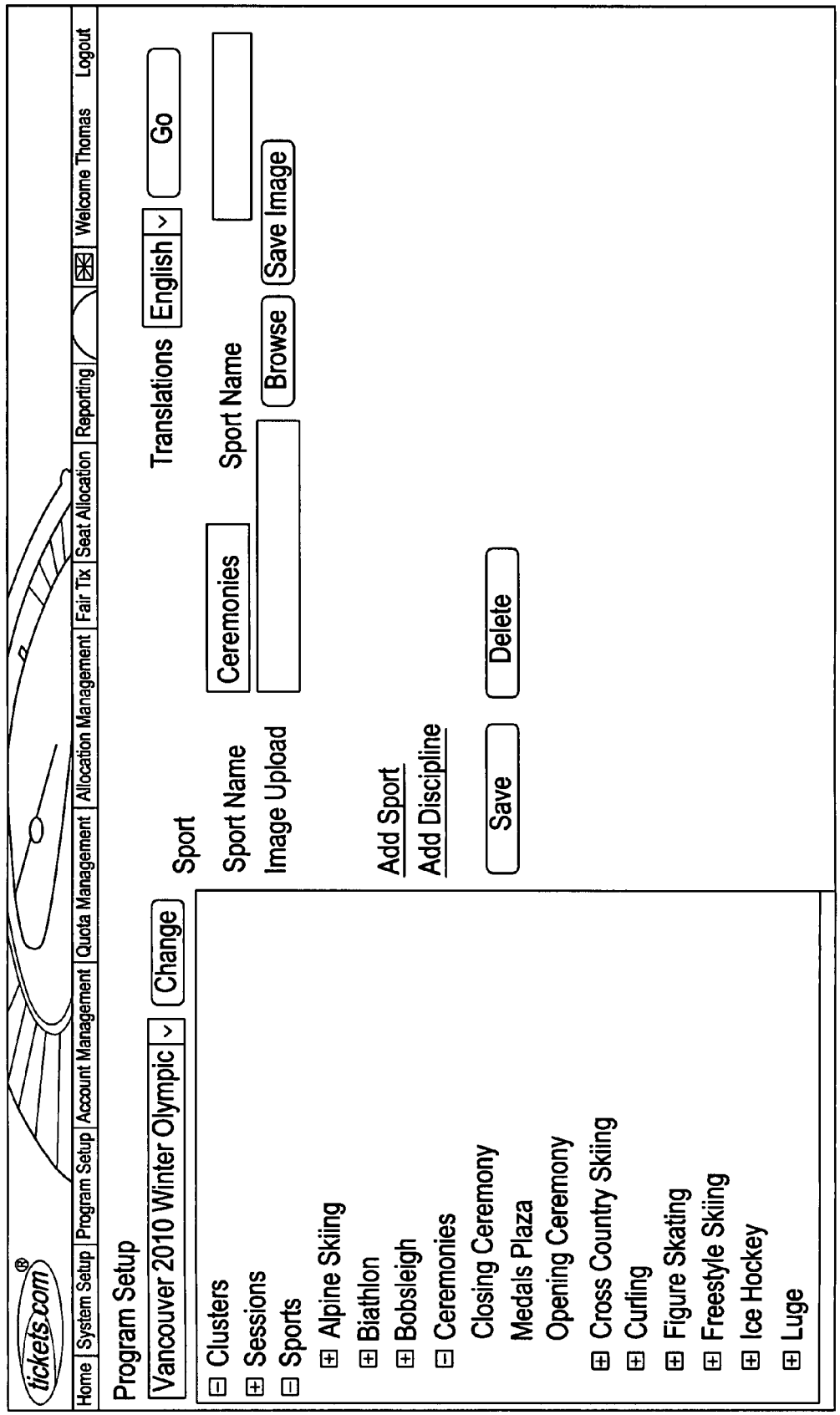

According to one embodiment of the invention, FIGS. 3-5 show an exemplary user interface for event setup functionality of a administrative module 200 in accordance with one embodiment. The administrative module allows a user to enter information into the RMS 30 concerning an item for sale. For example, the user can enter information concerning an event (e.g., time, place, type) for which the RMS 30 will sell tickets. For example, during the setup for an "Olympic" type event, the event setup interface allows a user to populate database tables related to venues/cluster information 210, (FIG. 3) sports/disciplines information 220 (FIG. 4), sessions/subsessions information 230 and pricing (FIG. 5).

Order/Patron Administration

Figure 7:
Figure 8:
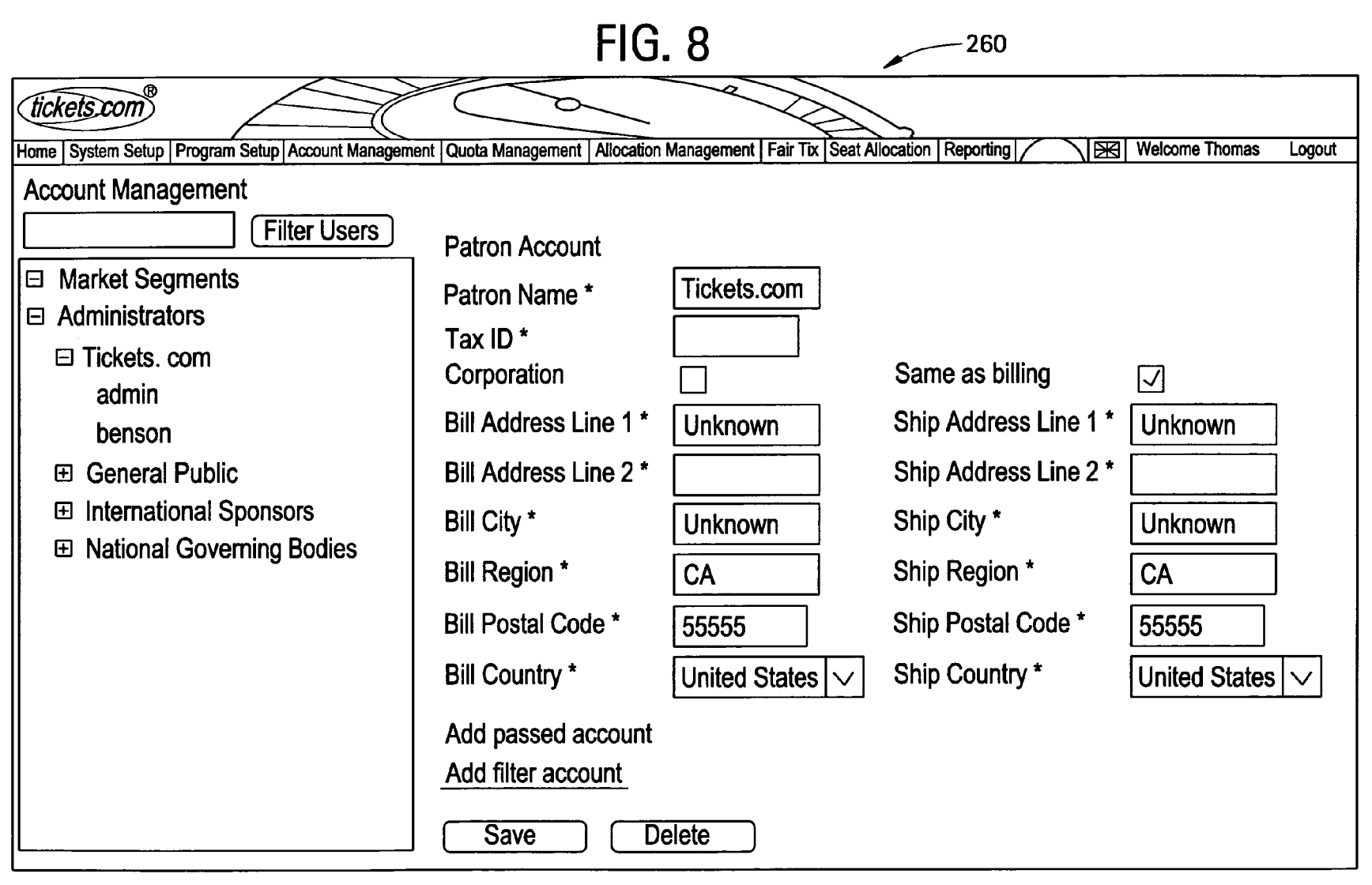
Figure 9:
Figure 16B:
Figure 19:
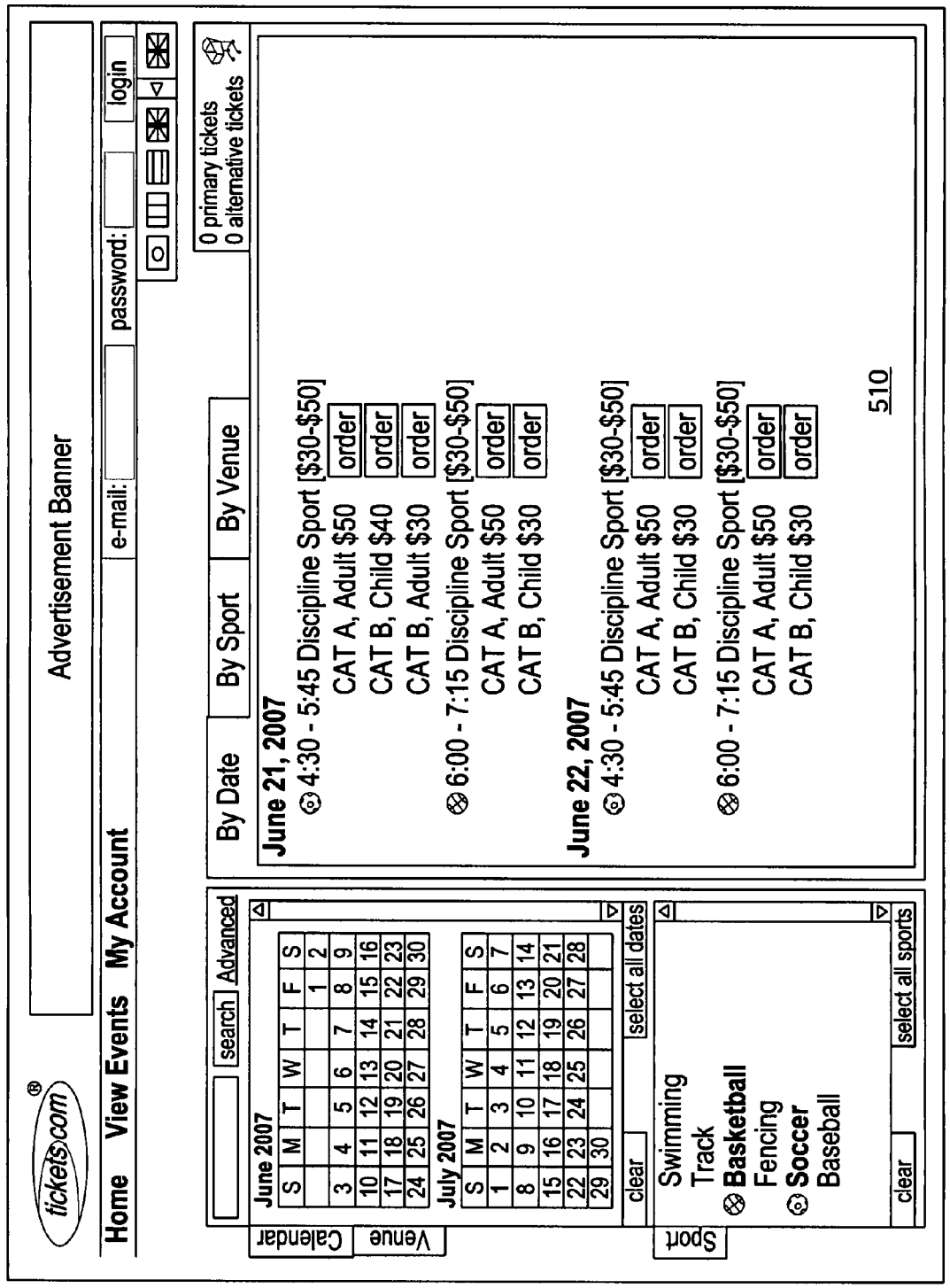
Figure 21:
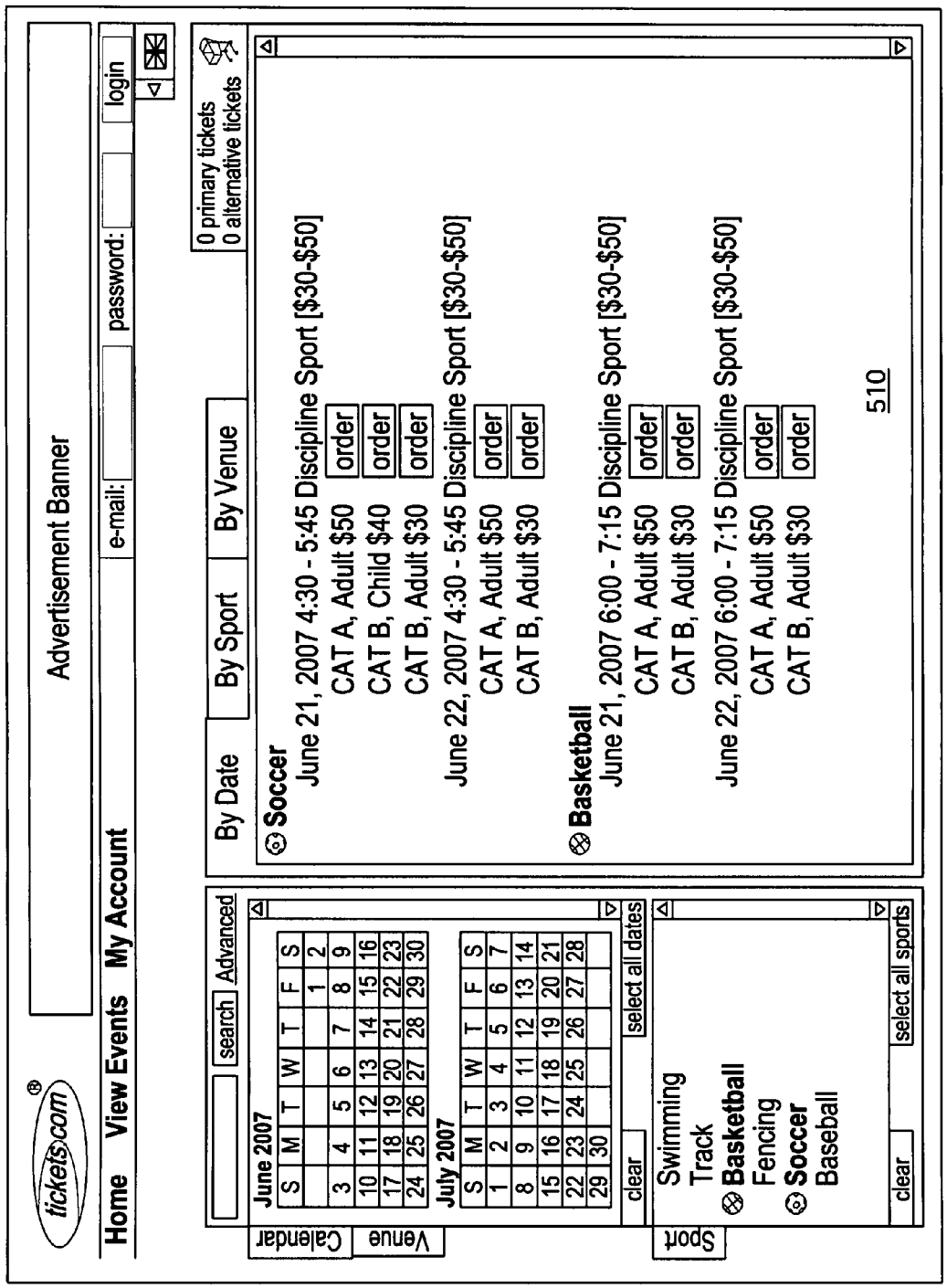

According to one embodiment of the invention, the administration module allows a user to insert/edit patron information, insert/modify orders, apply payments and generate invoices. FIGS. 7-9 show exemplary user interfaces for implementing the order and patron administration functionality of the administration module 200. FIG. 7 is a user interface for order administration 250. As shown, the order interface 250 allows a user to enter and modify information related to a ticket order. FIG. 8 shows a user interface for adding and editing patron information 260. Information that can be added and edited for a patron includes, but is not limited to account information (name, company, phone, etc.), billing information and shipping information. FIG. 9 shows a user interface for displaying and editing patron history information 270. For example, the administration module 200 allows a user to view and edit past orders submitted by a patron. FIG. 10 demonstrates the foreign language capabilities 425 of the RMS system.

Group Request Module

FIG. 11 shows a group request user interface 310. Using the interface 310, the group request module 300 allows groups to place ticket requests including the ability to specify the session of the event desired, alternative tickets desired, the quantity, the price category and submit their request to the RMS 30 system. All group requests are managed by a shopping module 500 that will be discussed in greater detail below. In addition, the group request module 300 also allows a group client to generate a limited number of reports on their requests.

Public Request Module

FIGS. 12-18 are public request user interface screens. A standard transaction flow carried out by the public request module, as shown in FIGS. 12-18 will now be described. According to one embodiment of the invention, FIG. 12 shows how the public request module presents general account information to a user using an account interface 410. From the account interface 410 a user can choose to shop for tickets to events, view any current ticket selections they may have made and edit their account information. FIG. 13 shows a date interface 420 which displays a user's ticket selections by date. The date interface allows a user to effectively plan their ticket purchases.

FIG. 14 shows a purchase interface 430. The purchase interface 430 presents event tickets for purchase to the user. According to one embodiment of the invention, the group request module 400 uses the ticket purchase interface to present the user with information on what events are available for ticket purchase. Information that may be presented to the user includes, but is not limited to the date and time of the event, the event type, a session description, a venue for the event and the price. As shown in FIG. 14, the group request module may offer the user the choice of purchasing individual tickets to an event or purchasing a ticket package.

After a user selects an event to purchase tickets for, the public request module presents the user with a purchase detail interface 440 as shown in FIGS. 15A-15B. According to one embodiment of the invention, the purchase detail interface 440 presents the user with additional details about the item selected. In addition, the purchase detail interface 440 allows a user to select the quantity of tickets desired, the buyer type of the tickets, the price level of the tickets and any other additional information related to the ticket purchase or patron accommodations. Once the user has finalized their selection, the public request module 400 adds the selection to the shopping module 500.

Once a user has indicated that they wish to finalize the purchase of tickets, the public request module 400 presents the user with a contact and payment interface 450. This interface is shown for example in FIG. 17. The contact and payment interface allows a user to enter their contact information and payment information. Payment information will vary depending upon the payment method. According to one embodiment, the group request module is configured to facilitate payment using credit or debit cards. In this embodiment the user enters their credit card information to complete the transaction.

Shopping Module

Figure 20:
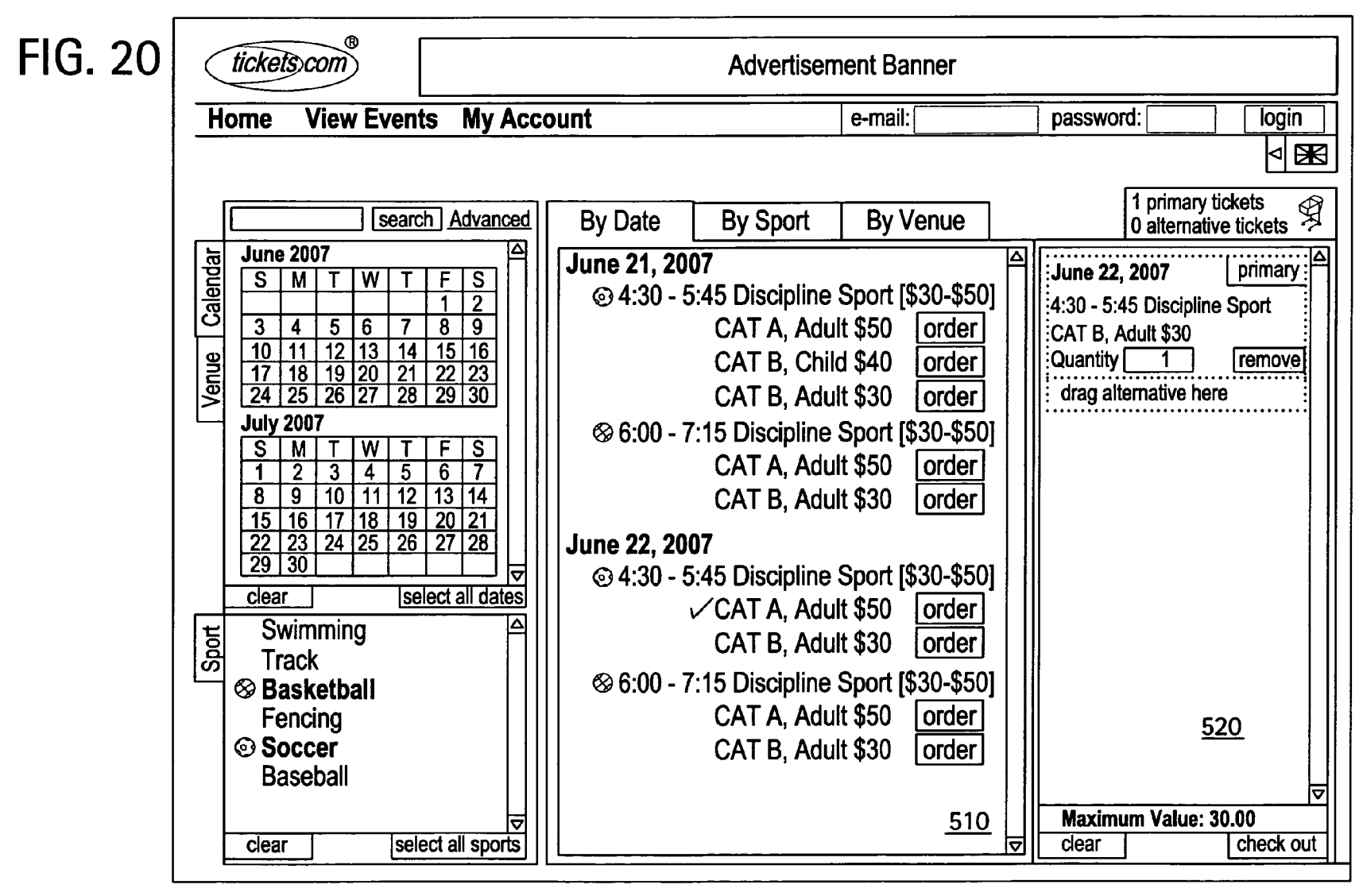

The shopping module 500 operates in conjunction with a user interface similar to the interfaces shown in FIGS. 19-22. The user interface includes at least two panels that display information to the user. The product information panel 510 displays various products and information to the user. For example, as shown in FIGS. 19-22 the product information panel displays information related to the events that a user can purchase tickets for. As shown in FIGS. 20 and 22, the shopping module 500 is also configured to provide a selected item panel 520 that displays a user's selection for purchase (e.g., event tickets). As shown in FIGS. 19-22, the selected item panel 520 of the shopping cart can be expanded or collapsed.

The shopping module 500 allows a user to purchase an item and designate that item as primary or alternate. For example, in FIG. 20 the selected item panel 520 displays one event ticket that was selected by a user. The selected ticket has been designated as primary. The primary designation indicates that if a ticket to this event is available, it is the user's primary choice for purchase.

The shopping module 500 also allows a user to select additional items. Similar to the example given above, the item may be designated as primary or alternative. A user can designate an item as alternative to indicate to the RMS 30 that the user would like to purchase the item designated alternate if any items designated primary are no longer available for purchase.

According to one embodiment of the invention, the shopping module 500 allows a user identified in the RMS 30 as a public patron to order tickets and designate a primary event and an alternate event. Thus, during ticket processing, if the user's primary event is not available, the RMS 30 attempts to allocate tickets to the alternate event to the user. For a user designated as having a public account, the shopping module 500 displays the quantity of all primary tickets in the cart, the quantity of the alternative tickets in the cart and the maximum cost of all tickets stored in the dynamic cart. Once the RMS 30 has confirmed the ticket purchase, the user's credit card is charged.

Alternatively, for a user designated as corporate patron in the RMS 30, the shopping module can store and track new order or change order information. According to one embodiment of the invention, alternative ticketing functionality is not made available to a corporate/group user. Further, the shopping module 500 can update and display the latest event information for all the corporate users' previous orders. For a user designated as a corporate user, the shopping module displays the quantity of all tickets in the dynamic cart, the change in quantity of all tickets, previous hi/lo ratio, new hi/lo ratio, maximum cost of tickets in a cart and a change in maximum cost of tickets. Once the RMS has confirmed the ticket quantities for the corporate user, the user's account is invoiced.

Figure 27:
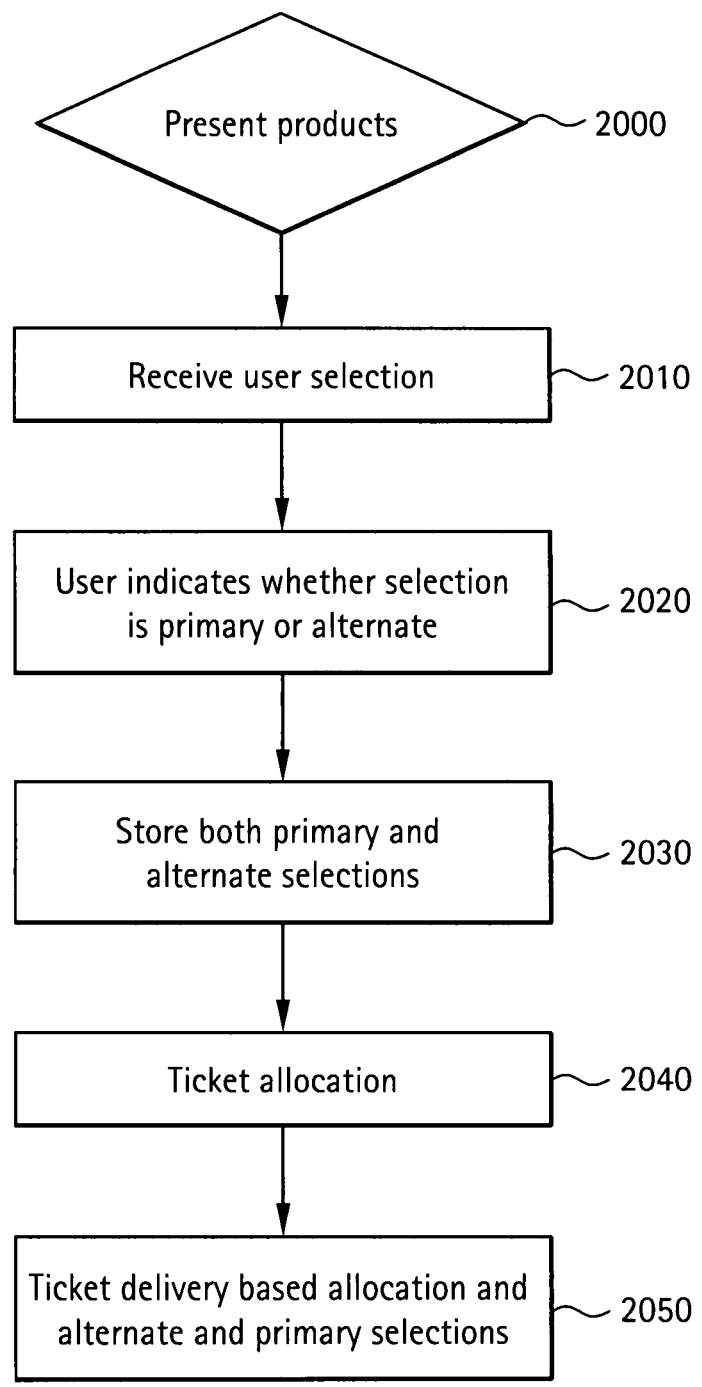
FIG. 27 is a flow chart describing the functionality of the shopping module.
Figure 28:
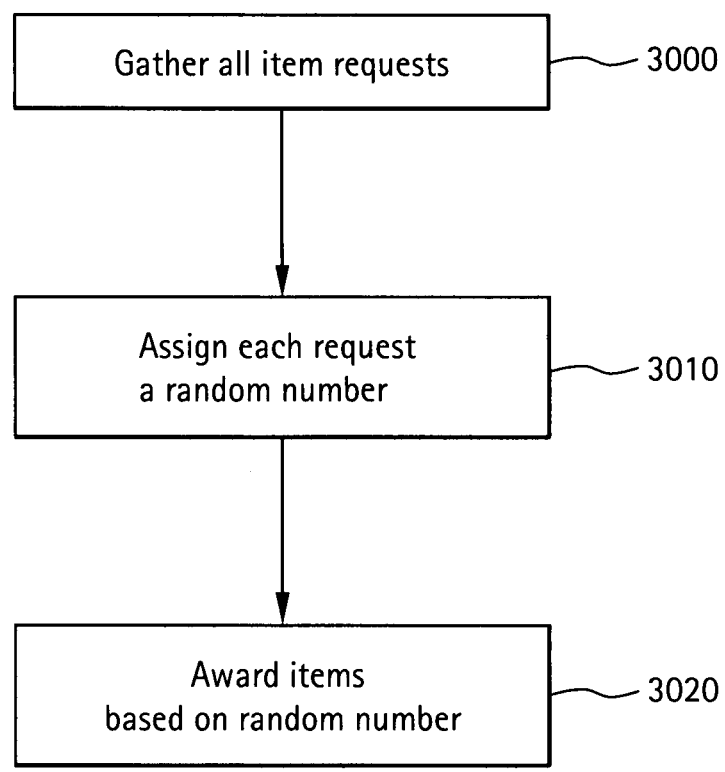
FIG. 28 is a flow chart describing the functionality of the lottery module.

The functionality of the shopping module as illustrated in FIG. 27 will be further described below. According to one embodiment of the invention, the RMS 30 presents products for purchase (e.g., event tickets) to a user (Step 200). In turn the RMS 30 allows a user to select (via any known user interface method, e.g. mouse, keyboard, voice command, etc.) an item the user wishes to purchase (Step 2010). Where the RMS 30 is being used to facilitate ticket sales for "Games" type events the user selects an event that the user wishes to purchase tickets for. The user selection is then recorded with the shopping module 500.

The shopping module 500 allows the user to place an order for any number of tickets to any number of events. In addition, as stated above, the shopping module 500 allows the user to indicate whether each order should be designated as a primary item or an alternative item (Step 2020).

As shown in FIGS. 19-22, according to one embodiment of the invention, in the product information panel 510, each event for which a ticket can be purchased has an order button adjacent to the event. If a user selects the order button, the event is added to the shopping module as a primary cart item. In the alternative, using a mouse, the RMS 30 can allow a user to "drag" an event into the selected item panel 520. The dragged item can be added as a primary cart item. However, as shown in FIG. 20, if the event is dragged into an alternative area of the selected item panel 520 (denoted in this embodiment as "drag alternative here") the event becomes the alternate event to a selected primary event. The shopping module stores each selection whether it is designated primary or alternate (Step 2030).

The shopping module 500 assigns several attributes to each new order in order to identify and track the order. For example, session code, date and time, discipline and sport, venue, ticket category, buyer type, individual ticket price, total ticket cost, and ticket quantity are attributes assigned to each ticket order. According to another embodiment, the shopping module 500 assigns several attributes to each order that is designated as a change order item. For example, session code, date and time, discipline and sport, venue, ticket category, buyer type, individual ticket price, previous ticket quantity, change in quantity of tickets, total ticket cost, change in total ticket cost, editable new ticket quantity, are attributes assigned to each changed ticket order.

Once a user has completed ordering, the shopping module 500 allows the user to proceed to a checkout function. The checkout function of the shopping module 500 presents the user with a detailed display of the items selected by the user prior to order submission. In addition, the checkout functionality allows the user to make any changes to the order before payment is authorized.

The shopping module 500 stores both the primary and alternate selection of a user until the purchase items are allocated. For example, in large scale events where the availability of event tickets is unknown, a user's primary and alternate selections persist in the shopping module 500 until a point in time where the tickets to the event are allocated (Step 2040). Based on the allocation of tickets, the shopping module 500 processes a user's order based on the user's primary and alternate selections (Step 2050). A detail explanation of the allocation processes used by the RMS 30 is set forth below.

Lottery Module

Figure 24:
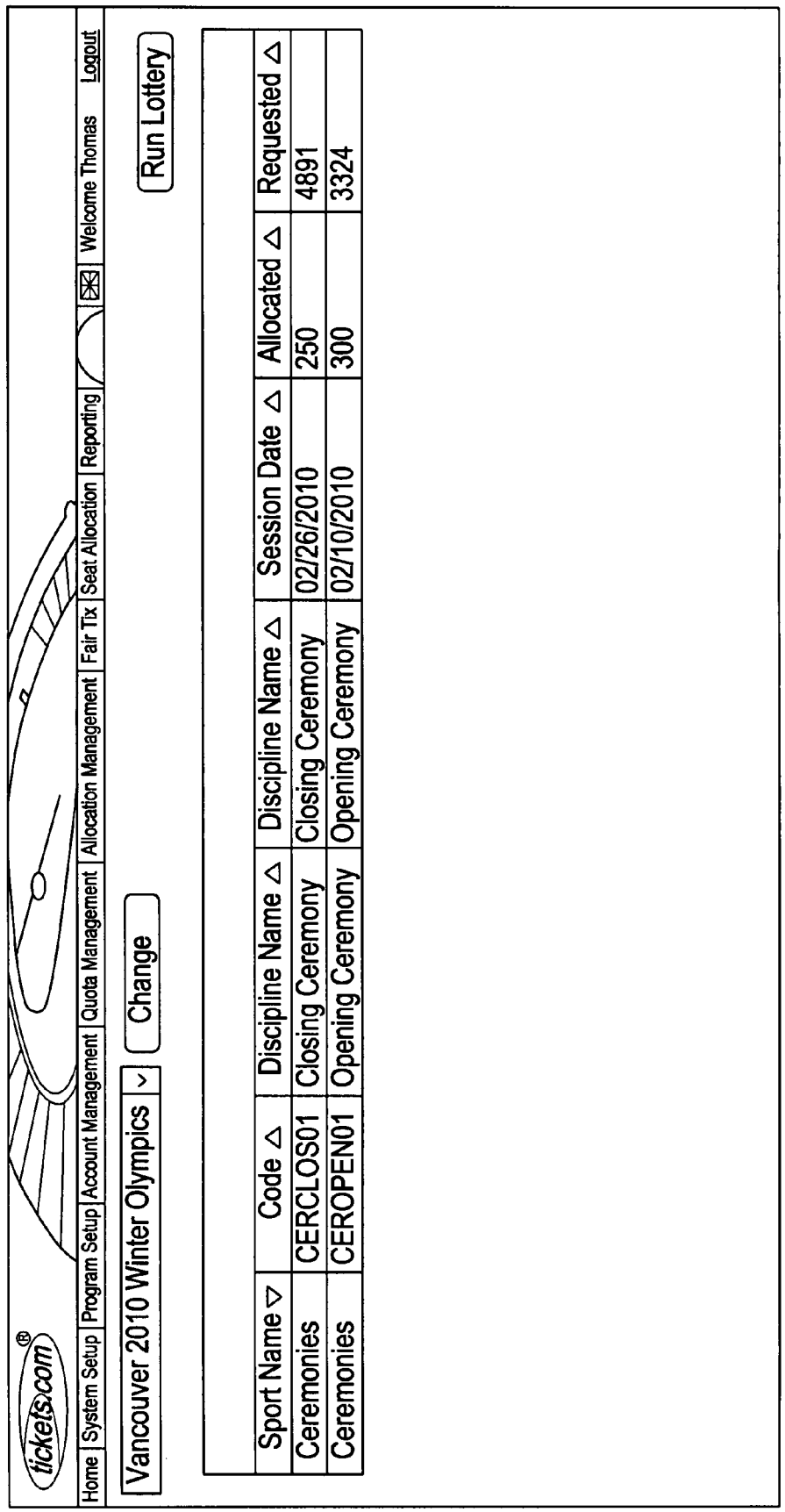
FIG. 24 is a user interface for a request management system lottery module according to one embodiment of the invention.

FIG. 24 shows an example of a user interface for the lottery module 600. According to one embodiment of the invention, the lottery module 600 processes each lottery item in order of magnitude, from most over-requested to least. The lottery process proceeds as follows:

The lottery module 600 gathers all primary requests and alternate requests for a particular item (Step 3000). The lottery module 600 assigns each request a random number (Step 3010).

Next, the lottery module 600 orders the item requests according to the assigned random number and the items are awarded until all availability is exhausted (Step 3020). Where the primary requests are not satisfied, the associated alternate requests become valid for consideration, assuming the request is for an item which has yet to be processed and exhausted. These steps may be repeated as necessary until all available items have been allocated to a patron.

According to another embodiment of the invention, the lottery module 600 is configured to utilize cascading functionality during the lottery process. Cascading means that if a user requests tickets for a certain price level, and is not awarded seats, the user's item request is automatically processed with requests in the next lower price level for the same session. According to one embodiment of the invention, when utilizing cascading, all subsessions for a given session must be processed together, in order of most expensive to least expensive.

Group Allocation Module

FIG. 23 is a user interface for displaying entity allocations to a user. According to one embodiment of the invention, the group allocation module 700 allocates items proportional to the demand for those items. Specifically, the group allocation module 600 will distribute available items using a proportion of each customer demand out of the total demand. Applying the RMS 30 to a Games type event, certain conditions are adhered to. For example, the allocation for one session does not affect any other session allocation. Calculations of demand and proportions are based only on the subsession being processed. The group allocation module 600 ignores the existing allocations (manually locked by the user during the process). Demand for these customers is not included as part of the total demand calculation. The allocations are always rounded down (2.01 and 2.99, both are allocated 2.0). Customers with higher demand will get more tickets. If there are huge disparities between different requests within a market segment, the uniform method described below is more appropriate, as it assures that even small customers receive some tickets.

According to another embodiment of the invention, the group allocation module 700 calculates the average quota availability (quota divided by customers) and distributes the average number of items requested, or all of the tickets requested (if demand is less than average). This method is referred to as the uniform method. When the RMS 30 is used for an Olympic type event, certain conditions for the Uniform method apply. An "average" is calculated by dividing available quota evenly by the number of unallocated requests. The group allocation module 700 evaluates the request, and the average, and awards the lower of the two. If the average is greater than the number requested for a particular client, the excess is added to the availability for the next pass. The group allocation module continues to make passes in this manner until all availability has been utilized or all requests have been satisfied. The group allocation module 700 will always round the allocation down.

According to yet another embodiment of the invention, the group allocation module 700 distributes items using the averaging method first (only initial pass) and then continues with a proportional allocation if there is still any quota left. When the RMS 30 is used for an Olympic type event, certain conditions for this hybrid method apply. One Uniform pass is made, awarding the "average" number of tickets to all unsatisfied requests. The remaining tickets are assigned using the Proportional method, thereby assuring that clients who requested a greater number of tickets receive the proper allocation.

Quota Management Module

Figure 25A:
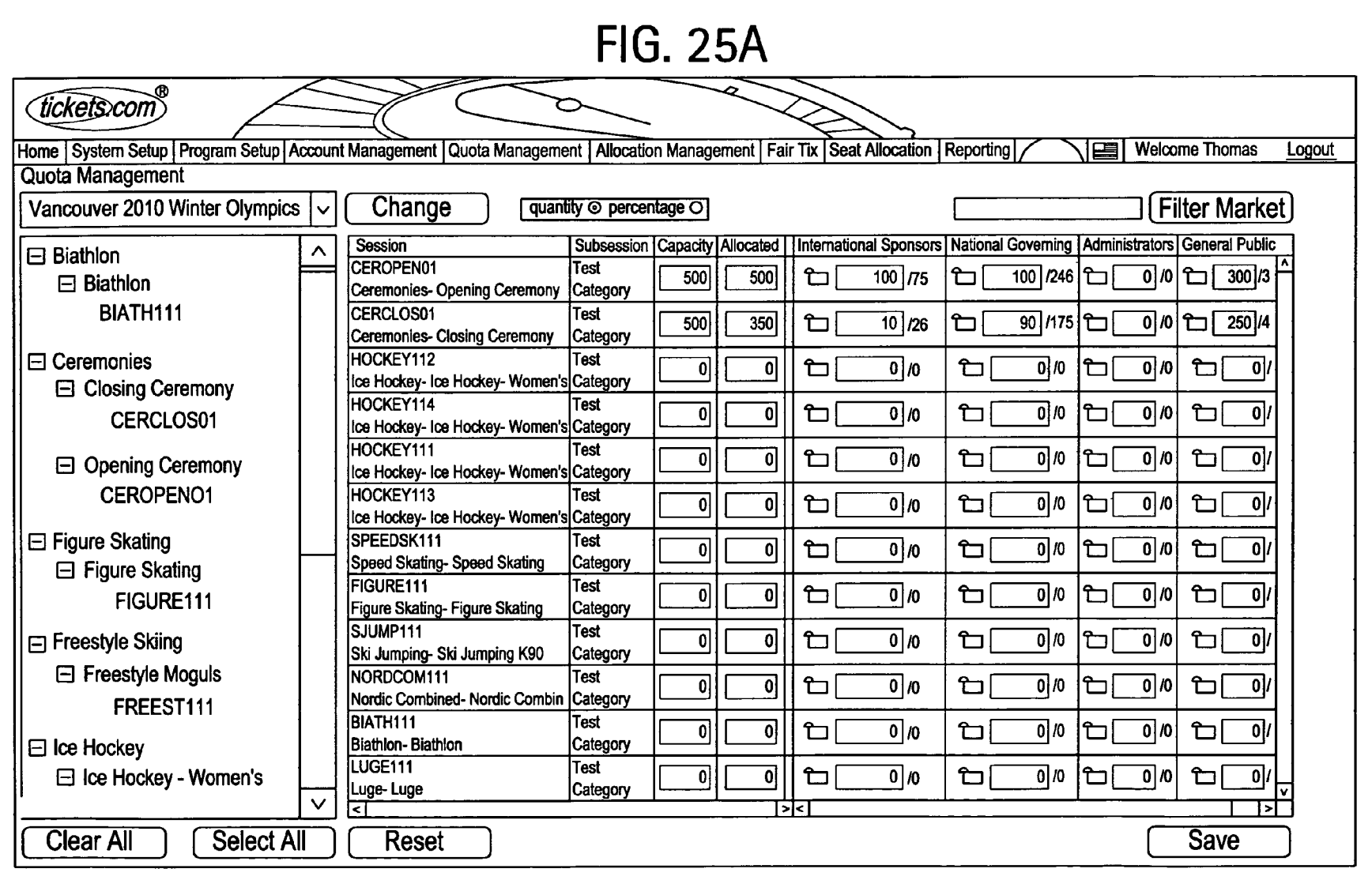
Figure 25B:

The quota management user interface is shown for example in FIGS. 25($a$) and 25($b$). The functionality of the quota management module 800 will now be described using a "Games" type event as context. However, it should be understood that the quota management module 800 is used to manage inventory in a number of contexts.

The RMS 30 assigns each client account to a "market segment." For each session and subsession (price level/section for a particular event), inventory is apportioned to each market segment. In this way, the organizing committee can assure that a certain quota of tickets is made available to a particular grouping of clients. When the allocation and lottery modules are executed, they use the quota availabilities for each market segment when allocating/awarding tickets. When manually confirming orders, the quota management module 800 restricts a user from allocating tickets to a particular market segment in excess of the allotted quota.

The quota management module 800 allows the user to easily manage the quota distributions across market segments for each subsession. The quota management module 800 also has functions which allow the user to set quotas based on percentages, and to easily redistribute tickets en mass among market segments.

Seat Assignment Module

Figure 26:
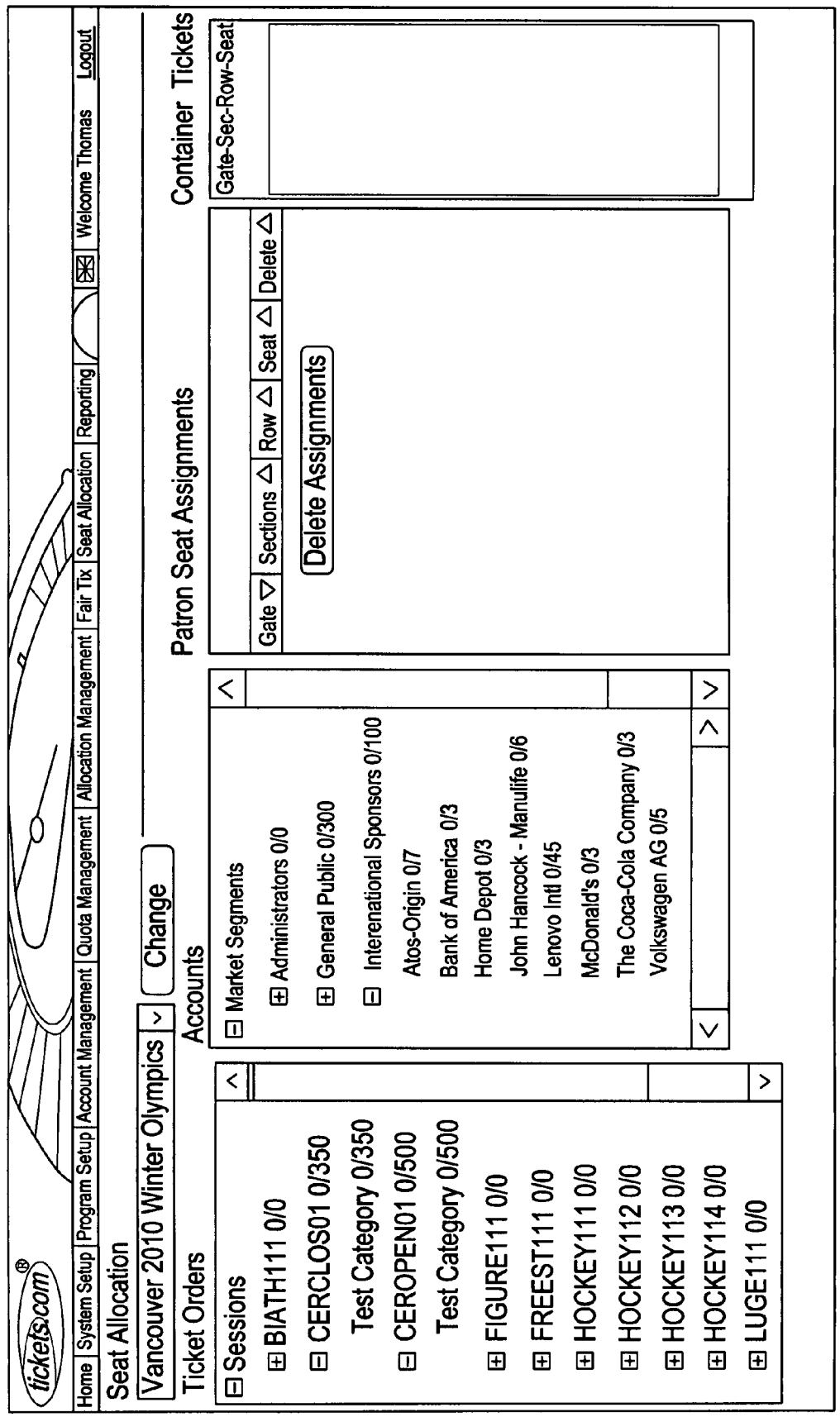
FIG. 26 is a user interface for a request management system seat assignment module.

The seating assignment interface shown in FIG. 26 allows the client to associate section/row/seat values with sold tickets. In addition to this feature being used for world events, the seat assignment module is used by clients for events like post-season/championship seat assignments, etc.

BOTS Interface

According to another embodiment of the invention, the RMS 30 includes a back office interface 1000 that allows the RMS 30 to transfer order/request information to a back office system. For example, the RMS 30 can transfer order/request information to the BOTS 40 described above. Preferably, the RMS 30 and BOTS 40 systems are implemented using Web services that allow synchronization between the systems.

The RMS 30 will be configured to operate with and use commercially available reporting products. In addition, various modules of the RMS 30 are configured to generate native reports.

The present invention has several advantages. The present invention provides a stable, modem platform for delivering ticketing services to large-scale events that can be easily adapted for various types of events.

Software and Web implementations of the present invention could be accomplished with standard programming techniques with rule based logic and other logic to accomplish the various database searching steps, correlation steps, comparison steps and decision steps. It should also be noted that the words "component" and "module," as used herein and in the claims, is intended to encompass implementations using one or more lines of software code, and/or hardware implementations, and/or equipment for receiving manual inputs. The present invention also contemplates providing computer readable data storage means with program code recorded thereon (i.e., software) for implementing the method steps described earlier herein. Programming the method steps discussed herein using custom and packaged software is within the abilities of those skilled in the art in view of the teachings disclosed herein.

One skilled in the art would recognize that the foregoing describes a typical computer system connected to an electronic network. It should be appreciated that many other similar configurations are within the abilities of one skilled in the art and it is contemplated that all of these configurations could be used with the methods and systems of the present invention. Furthermore, it should be appreciated that it is within the abilities of one skilled in the art to program and configure a networked computer system to implement the method steps of the present invention, discussed earlier herein. For example, such a computing system could be used to implement the method of selecting and using a mixed site docking site panel as discussed earlier herein.

The present invention also contemplates providing computer readable data storage means with program code recorded thereon (i.e., software) for implementing the method steps described earlier herein. Programming the method steps discussed herein using custom and packaged software is within the abilities of those skilled in the art in view of the teachings and code fragments disclosed herein.

All the references discussed in the specification are expressly incorporated by reference herein for all purposes.

Other embodiments of the invention will be apparent to those skilled in the art from a consideration of the specification and the practice of the invention disclosed herein. It is not intended to be exhaustive or to limit the invention to the precise form disclosed, and modifications and variations are possible in light of the above teaching or may be acquired from practice of the invention. Rather, it is intended that the specification be considered as exemplary only, with such other embodiments also being considered as a part of the invention in light of the specification and the features of the invention disclosed herein.

What is claimed is:

1. A computer implemented method implemented by one or more processors for managing electronic requests for tickets to one or more events, comprising:

providing, by said one or more processors, a shopping module for receiving and storing user requests;

providing, by said one or more processors, a group allocation module for allocating tickets to a user designated as representing a group client;

providing, by said one or more processors, a lottery module for allocating tickets to a user designated as representing a public patron;

providing, by said one or more processors, a quota management module configured to manage the inventory of tickets for each of the one or more events by guaranteeing allocation of no less than a defined percentage of tickets for each of the one or more events to users designated as public patrons;

receiving, by said one or more processors, a primary request for at least one ticket to a first event from a user and storing the primary request in the shopping module;

providing, by said one or more processors, an option for requesting an alternate request to the user if the user is designated as representing a public patron;

receiving, by said one or more processors, an alternate request for at least one ticket to a second event from the user designated as representing a public patron and storing the alternative request in the shopping module; and allocating at least one ticket to the user, by said one or more processors, and by the lottery module if the user is designated as representing a public patron, wherein the at least one ticket is allocated by a random lottery from the primary request or alternate request, and a ticket from the alternate request is only allocated if the primary request is not fulfilled, and wherein the lottery module is configured to allocate tickets using a cascading lottery process wherein if a primary request for at least one ticket to a first event is not fulfilled at an initial price level, the primary request is processed by the lottery module with requests at the next lower price level for the first event; and allocating at least one ticket to the user from the primary request, by said one or more processors, and by the group allocation module if the user is designated as representing a group client, wherein the at least one ticket is allocated based on an average quota availability, wherein the average quota availability is calculated from a ticket quota for the first event divided by the number of group clients requesting tickets.

2. The computer implemented method of claim 1, wherein the shopping module is configured to allow primary and alternate requests to persist simultaneously until the at least one ticket is allocated.

3. A ticketing management system, comprising:
one or more server computers, comprising:
 a request management system, configured to receive one or more ticket requests to an event and allocate one or more tickets to a purchaser;
 a back-end office ticketing system, configured to record ticket requests;
 a fulfillment center configured to receive the ticket requests from the back-end office ticketing system and deliver the tickets to the purchaser;
 a quota management module configured to manage the inventory of tickets for the event by guaranteeing allocation of no less than a defined percentage of tickets for the event to purchasers designated as public patrons;
 a lottery module configured to allocate tickets to the purchaser if the purchaser is designated as representing a public patron by a random lottery, wherein the lottery module is configured to allocate tickets using a cascading lottery process wherein if a request for a ticket to the event is not fulfilled at an initial price level, the request is processed by the lottery module with requests at the next lower price level for the event; and
 a group allocation module configured to allocate tickets to the purchaser if the purchaser is designated as representing a group client based on an average quota availability, wherein the average quota availability is calculated from a ticket quota for the event divided by the number of group clients requesting tickets.

4. The ticketing management system of claim 3, wherein the request management system further comprises:
 a database for storing ticket and event information;
 a public request module, configured to receive and process one or more individual ticket requests from the purchaser designated as a public patron;
 a group request module, configured to receive and process requests for group tickets from the purchaser designated as representing a group client; and
 a shopping module, configured to receive and store individual and group ticket requests.

5. The ticketing management system of claim 4, wherein the public request module allows the purchaser designated as a public patron to designate ticket requests as primary or alternate.

6. A request management system, comprising:
one or more computers, the one or more computers comprising the following elements:
 a database for storing ticket and event information;
 a public request module, configured to receive and process individual ticket requests for an event from a purchaser designated as a public patron;
 a group request module, configured to receive and process requests for group tickets for the event from a purchaser designated as representing a group client;
 a shopping module, configured to track individual and group ticket requests; and
 a quota management module configured to manage the inventory of tickets for the event by guaranteeing allocation of no less than a defined percentage of tickets for the event to purchasers designated as public patrons;
 a lottery module configured to allocate tickets to the purchaser if the purchaser is designated as representing a public patron by a lottery, wherein the lottery module is configured to allocate tickets using a cascading lottery process wherein if a request for a ticket to the event is not fulfilled at an initial price level, the request is processed by the lottery module with requests at the next lower price level for the event; and
 a group allocation module configured to allocate tickets to the purchaser if the purchaser is designated as representing a group client based on an average quota availability, wherein the average quota availability is calculated from a ticket quota for the event divided by the number of group clients requesting tickets.

7. The request management system of claim 6, wherein the public request module allows the purchaser designated as a public patron to designate ticket requests as primary or alternate.

8. A computer program product for managing ticket requests for one or more events, embodied in a non-transitory computer readable medium, which when executed performs a method, comprising:
 providing a shopping module for receiving and storing user requests from a user,
 providing a quota management module configured to manage the inventory of tickets for each of the one or more events by guaranteeing allocation of no less than a defined percentage of tickets for each of the one or more events to users designated as public patrons;
 providing a group allocation module for allocating tickets to a user designated as representing a group client;
 providing a lottery module for allocating tickets to a user designated as representing a public patron;
 receiving a primary request for at least one ticket for a first event from a user and storing the primary request in the shopping module;
 receiving an alternate ticket request for a second event from the user designated as representing a public patron and storing the alternative request in the shopping module; and
 allocating at least one ticket to the user by the lottery module if the user is designated as representing a public patron by a random lottery, wherein the at least one ticket is allocated from the primary or the alternative request, and a ticket from the alternative request is only allocated if the primary request is not fulfilled, and wherein the lottery module is configured to allocate tickets using a cascading lottery process wherein if a primary request for at least one ticket to a first event is not fulfilled at an initial price level, the primary request is processed by the lottery module with requests at the next lower price level for the first event; and
 allocating at least one ticket to the user from the primary request by the group allocation module if the user is designated as representing a group client, wherein the at least one ticket is allocated based on an average quota availability, wherein the average quota availability is calculated from a ticket quota for the first event divided by the number of group clients requesting tickets.

9. A computer program product for managing ticket requests as claimed in claim 8, wherein the shopping module is configured to allow primary and alternate requests to persist simultaneously until the at least one ticket is allocated.

10. A system for managing ticket requests for one or more events, comprising:
- a client terminal for placing user requests; and
- a server computer, operably connected to the client terminal, including:
- a processor for processing information; and
- a memory unit, including:
  - a computer program product, embodied in a non-transitory, computer readable medium, which when executed performs a method, comprising:
    - providing a shopping module for receiving and storing user requests from the client terminal,
    - providing a quota management module configured to manage the inventory of tickets for each of the one or more events by guaranteeing allocation of no less than a defined percentage of tickets for each of the one or more events to users designated as public patrons;
    - providing a group allocation module for allocating tickets to a user designated as representing a group client;
    - providing a lottery module for allocating tickets to a user designated as representing a public patron;
    - receiving a primary request for at least one ticket to a first event from the client terminal and storing the primary request in the shopping module;
    - providing an option for requesting an alternate request to the client terminal if the user is designated as representing a public patron;
    - receiving an alternate request for at least one ticket to a second event from the client terminal if the user is designated as representing a public patron and storing the alternative request in the shopping module; and
    - allocating at least one ticket to the user by the lottery module if the user is designated as representing a public patron by a lottery, wherein the at least one ticket is allocated by a random lottery from the primary or alternate request, and the alternate request is only fulfilled if the primary request is not fulfilled, and wherein the lottery module is configured to allocate tickets using a cascading lottery process wherein if a primary request for at least one ticket to a first event is not fulfilled at an initial price level, the primary request is processed by the lottery module with requests at the next lower price level for the first event; and
    - allocating at least one ticket to the user from the primary request by the group allocation module if the user is designated as representing a group client, wherein the at least one ticket is allocated based on an average quota availability, wherein the average quota availability is calculated from a ticket quota for the first event divided by the number of group clients requesting tickets.

11. The system of claim 10, wherein the shopping module is configured to allow primary and alternate requests to persist simultaneously until the at least one ticket is allocated.

12. A ticketing management system, comprising:
- a first server computer, having a request management system, configured to receive one or more ticket requests to an event and allocate tickets to a purchaser;
- a second server computer, having a back-end office ticketing system, configured to record ticket requests;
- a fulfillment center configured to receive the ticket requests from the back-end office ticketing system and deliver the tickets to the purchaser; and
- a quota management module configured to manage the inventory of tickets for the event by guaranteeing allocation of no less than a defined percentage of tickets for the event to purchasers designated as public patrons;
- a lottery module configured to allocate tickets to the purchaser if the purchaser is designated as representing a public patron by a lottery, wherein the lottery module is configured to allocate tickets using a cascading lottery process wherein if a request for a ticket to the event is not fulfilled at an initial price level, the request is processed by the lottery module with requests at the next lower price level for the event; and
- a group allocation module configured to allocate tickets to the purchaser if the purchaser is designated as representing a group client based on an average quota availability, wherein the average quota availability is calculated from a ticket quota for the event divided by the number of group clients requesting tickets.

13. The ticketing management system of claim 12, wherein the first server computer having the request management system further comprises:
- a database for storing ticket and event information;
- a processor for processing information; and
- a memory unit, including a computer product, embodied in a non-transitory computer readable medium, comprising:
  - a public request module, configured to receive and process one or more individual ticket requests from the purchaser designated as a public patron;
  - a group request module, configured to receive and process requests for group tickets from the purchaser designated as representing a group client; and
  - a shopping module, configured to receive and store individual and group ticket requests.

14. The ticketing management system of claim 13, wherein the public request module allows the purchaser designated as a public patron to designate ticket requests as primary or alternate.

15. A ticket request management server computer, comprising:
- a database for storing ticket and event information;
- a processor for processing information; and
- a memory unit, including a computer program product, embodied in a non-transitory computer readable medium, comprising:
  - a public request module, configured to receive and process one or more individual ticket requests for an event from a purchaser designated as a public patron;
  - a group request module, configured to receive and process requests for group tickets for the event from a purchaser designated as representing a group client;
  - a shopping module, configured to track individual and group ticket requests; and
  - a quota management module configured to manage the inventory of tickets for the event by guaranteeing allocation of no less than a defined percentage of tickets for the event to purchasers designated as public patrons;
  - a lottery module configured to allocate tickets to the purchaser if the purchaser is designated as representing a public patron by a lottery, wherein the lottery module is configured to allocate tickets using a cascading lottery process wherein if a request for a ticket to the event is not fulfilled at an initial price level, the request is processed by the lottery module with requests at the next lower price level for the event; and
  - a group allocation module to allocate tickets to the purchaser if the purchaser is designated as representing a group client based on an average quota availability, wherein the average quota availability is calculated from a ticket quota for the event divided by the number of group clients requesting tickets.

16. The ticket request management server of claim 15, wherein the public request module allows a purchaser designated as a public patron to designate ticket requests as primary or alternate.

* * * * *